United States Patent [19]

Tokunaga

[11] Patent Number: 5,151,296
[45] Date of Patent: Sep. 29, 1992

[54] METHOD FOR FORMING POLYCRYSTALLINE FILM BY CHEMICAL VAPOR DEPOSITION PROCESS

[75] Inventor: Hiroyuki Tokunaga, Kawasaki, Japan

[73] Assignee: Canon Kabushiki Kaisha, Tokyo, Japan

[21] Appl. No.: 613,705

[22] PCT Filed: Mar. 30, 1990

[86] PCT No.: PCT/JP90/00433

§ 371 Date: Nov. 28, 1990

§ 102(e) Date: Nov. 28, 1990

[87] PCT Pub. No.: WO90/12126

PCT Pub. Date: Oct. 18, 1990

[30] Foreign Application Priority Data

Mar. 31, 1989 [JP] Japan ................... 1-81107
Sep. 22, 1989 [JP] Japan ................... 1-247262

[51] Int. Cl.⁵ .................................... B05D 3/06
[52] U.S. Cl. .................................... 427/38; 427/39; 427/45.1; 427/255.1; 118/723
[58] Field of Search .............. 427/38, 39, 45.1, 255.1; 118/723

[56] References Cited

U.S. PATENT DOCUMENTS

| | | | |
|---|---|---|---|
| 4,818,560 | 4/1989 | Shihara et al. | 427/45.1 |
| 4,898,118 | 2/1990 | Murakami et al. | 427/39 |
| 4,900,694 | 2/1990 | Nakagawa | 427/39 |
| 5,010,842 | 4/1991 | Oda et al. | 427/39 |
| 5,030,475 | 7/1991 | Ackermann et al. | 427/45.1 |

OTHER PUBLICATIONS

Y. Nakayama et al., *J. Appl. Phys.*, vol. 62, No. 3, (Aug. 1987), pp. 1022–1028.

*Primary Examiner*—Michael Lusignan
*Assistant Examiner*—Bret Chen
*Attorney, Agent, or Firm*—Fitzpatrick, Cella, Harper & Scinto

[57] ABSTRACT

A method for forming a polycrystalline film, characterized by using hydrogen gas and a film forming raw material gas, contacting the hydrogen gas with an activating energy in a space different from a film forming space of a film forming chamber in which a substrate for film formation is arranged, to excite the hydrogen gas into an active species (H), introducing said active species (H) into the film forming chamber, simultaneously introducing the film forming raw material gas into the film forming chamber, independently from the active species (H), mixing and contacting the active species (H) with the film forming raw material gas to produce a plasma region in the film forming space maintained at a predetermined pressure, periodically changing the distribution of the concentration of the active species (H) near the surface of the substrate maintained at a predetermined temperature.

8 Claims, 13 Drawing Sheets

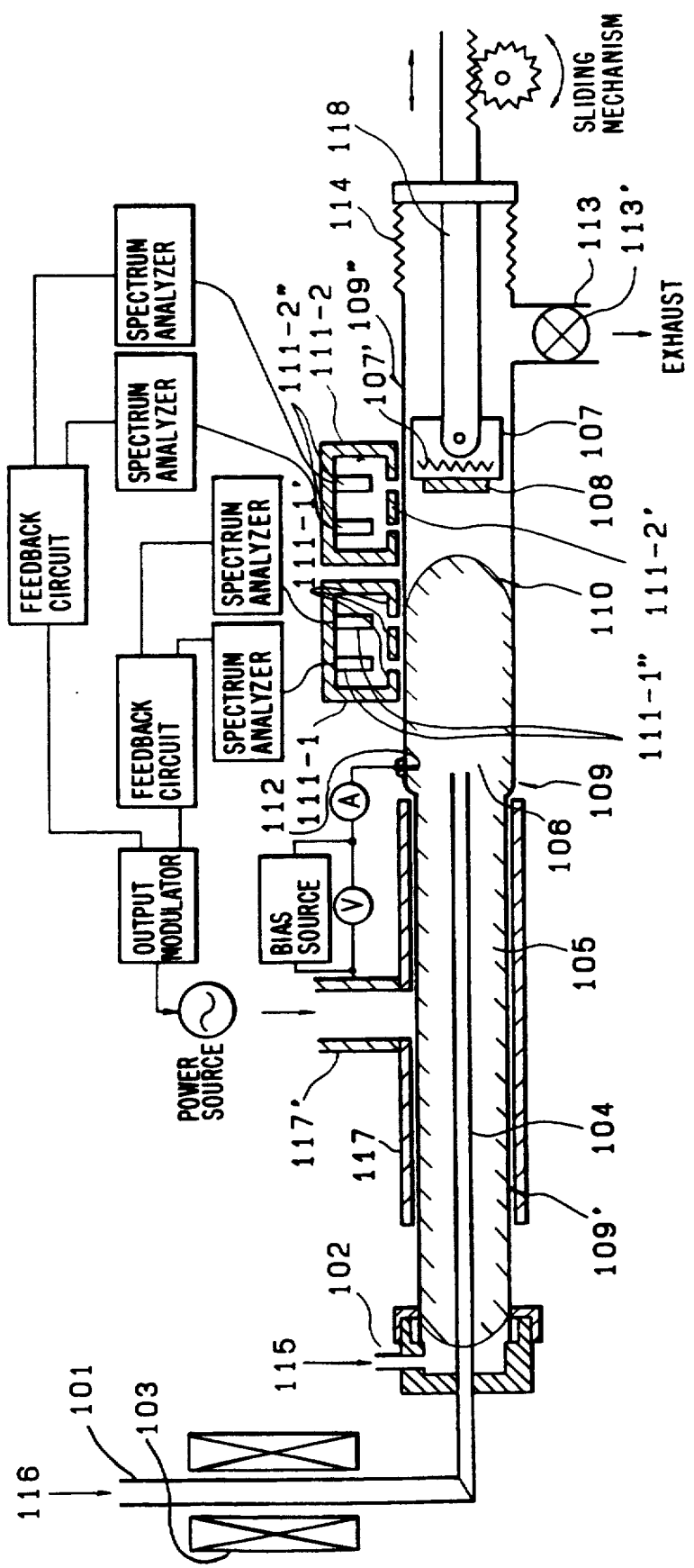

DISTANCE OF THE SUBSTRATE
FROM THE UPSTREAM

DISTANCE OF THE SUBSTRATE
FROM THE UPSTREAM

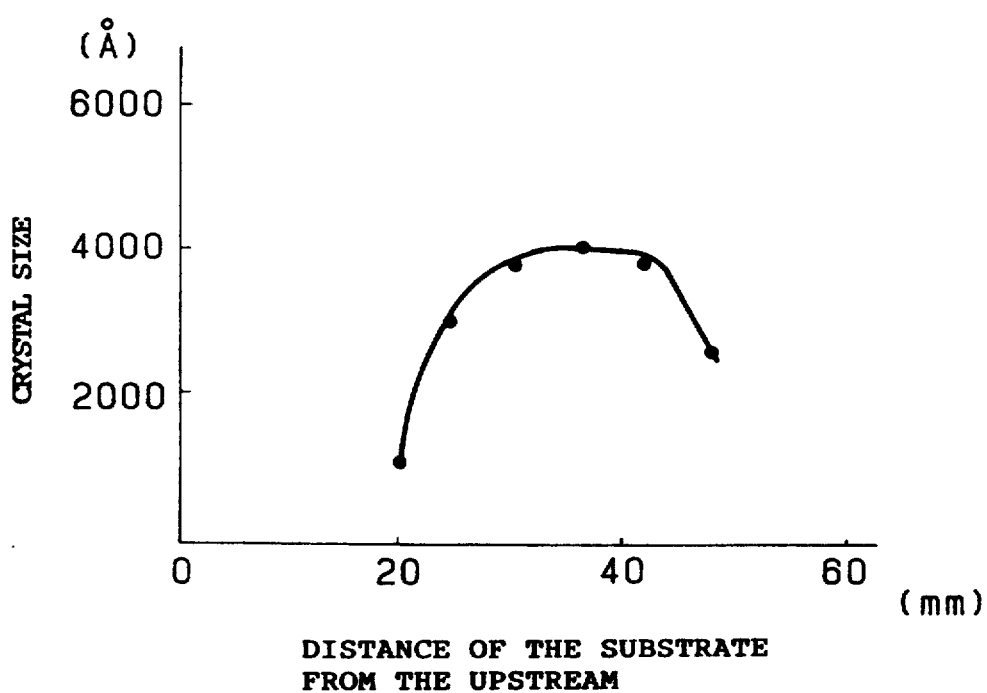

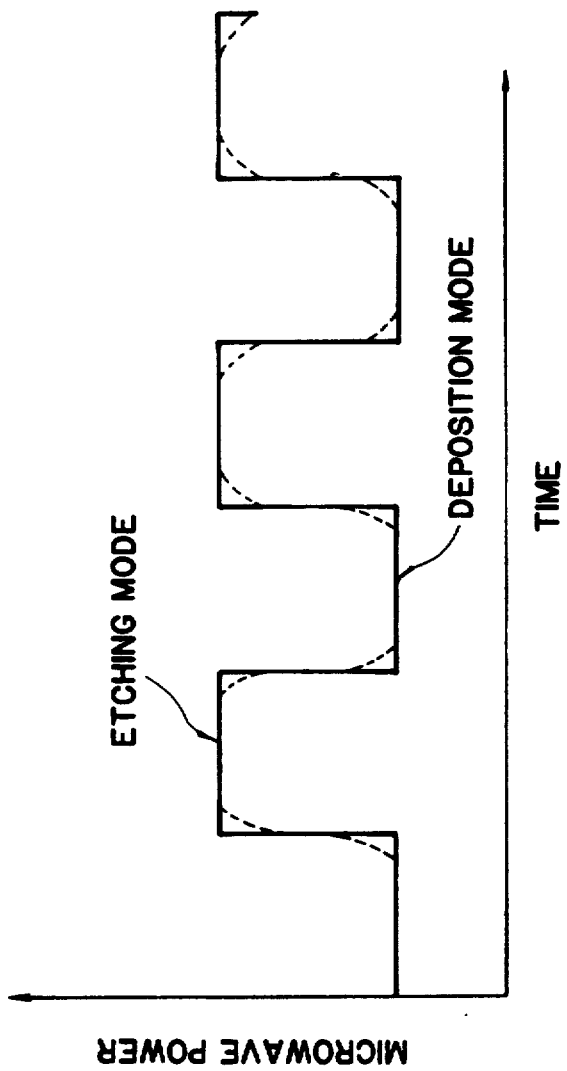

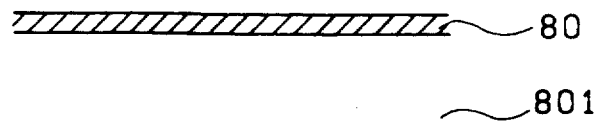
FIG. 8(A)
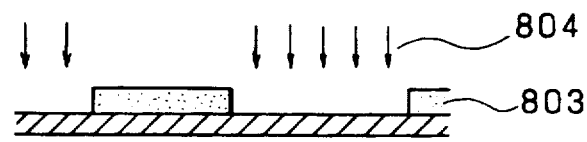
FIG. 8(B)
FIG. 8(C)
FIG. 8(D)
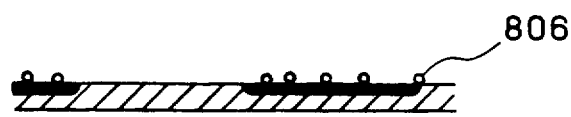
FIG. 8(E)
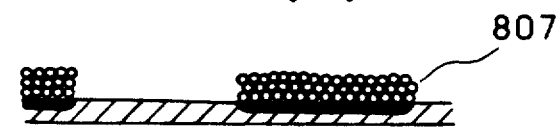

METHOD FOR FORMING POLYCRYSTALLINE FILM BY CHEMICAL VAPOR DEPOSITION PROCESS

FIELD OF THE INVENTION

The present invention relates to an improved method for forming a polycrystalline film useful as a constituent member of electronic devices such as semiconductor device and photovoltaic element, by a chemical vapor deposition process. More specifically, the present invention relates to a method for forming a deposited film, comprising introducing an active species (H) which is obtained by activating hydrogen gas and has an etching action of a deposited film to be formed, a film forming raw material gas having a property to form a deposited film by chemically reacting with the active species (H), or a precursor resulted from the raw material gas, into a film forming chamber where a substrate is installed, and forming therein a deposited film on the surface of the substrate, wherein the active species (H) is introduced into the film forming chamber in such manner that the amount of the active species to be fed onto the surface of the film to be deposited on the substrate is made to change periodically so that the growing speed of the film to be deposited on the substrate periodically changes to chemically react the active species (H) with the film forming raw material or the precursor, in order to form on the substrate a polycrystalline film preferentially grown along a given crystal orientation.

BACKGROUND OF THE INVENTION

Polycrystalline deposited films have been drawing recent attention as a constituent member of solar cell, thin-film transistor capable of rapid actuation, as well as large area display, and various types of polycrystalline deposited films have been proposed.

Such polycrystalline films are formed by film forming techniques such as thermal CVD process, heating vapor deposition method, reactive sputtering technique, molecular beam epitaxial method (referred to as "MBE method" hereinafter), ion plating method, and plasma CVD process. However, any one of these film forming techniques has been indicated to have problems in forming a polycrystalline deposited film. Particularly, according to the thermal CVD method, it is possible to obtain a polycrystalline deposited film to be worth of use, but there is a limit for the kind of a substrate which can be used, since film formation is carried out at elevated temperature.

In case of the heating vapor deposition method or reactive sputtering method, film formation may be carried out at a relatively low temperature; however, it is difficult to control the crystallinity, crystal orientation and composition ratio of a polycrystalline deposited film to be obtained and thus, it is difficult to stably obtain a desired polycrystalline deposited film.

In case of the MBE method, a desired polycrystalline deposited film can be obtained at a substantially low temperature, but the inner pressure should necessarily be maintained at an ultra-low pressure ($10^{-9}$ Torr or less) upon film formation, so that the method is not suitable for large-scale production.

As for the ion plating method, it unavoidably causes ion damages on a film to be deposited, which results in making the resulting polycrystalline deposited film accompanied by a great number of defects, whereby it is difficult to obtain a polycrystalline deposited film of high quality. The method also involves a problem in that it requires a relatively higher temperature at the film formation.

The plasma CVD method representatively includes microwave plasma CVD method and RF plasma CVD method. According to these plasma CVD methods, a large area polycrystalline deposited film may be possibly formed with the film forming condition of relatively low temperature, but it is extremely difficult to obtain a sufficiently oriented polycrystalline deposited film constantly. Film formation by these plasma CVD methods is carried out in the presence of a plasma, so that a film to be formed is exposed to plasma, whereby causing so-called plasma damage over the film. Because of this, the resulting deposited film often becomes such that is accompanied with many defects.

For those reasons, there has been proposed a method described in Japanese Unexamined Patent Publication No. 241326/1987, which comprises exciting a film forming raw material with microwave energy in a space different from a film forming space, (namely, an activating space), to generate an active species, transporting the activated species to the film forming space where the activated species is subjected to chemical reaction to thereby deposit a polycrystalline film on a substrate arranged in the film forming space. Particularly, this method comprises exciting in an activating space a film forming raw material gas, namely silicon halide gas, to generate an active species and transporting the active species to the film forming space, simultaneously decomposing other film forming raw material gas in the other activating space to generate other active species, followed by transporting to the film forming space, chemically reacting these active species with each other to form a deposited film on a substrate arranged in the film forming space, wherein a halogen gas or a halogen compound gas, or active species (X) generated by giving an activation energy to them, or active species (principally active species obtained from halogen compound), respectively being capable of exhibiting an etching action to the deposited film, is introduced into the film forming space where crystalline in a given crystal orientation is preferentially grown to form a polycrystalline deposited film.

Nonetheless, the method involves the following problems. That is: (i) it is extremely difficult to provide uniform distribution of the concentration of the halogen, halogen compound or active species (X) and thus it is difficult to form a homogeneous polycrystalline film having a uniform film thickness on a large area substrate; (ii) it is difficult to maintain the lifetime of the halogen, halogen compound or active species (X), each having an etching action, and the lifetime of the other active species as desired, in order that both may chemically react together to cause the formation of a film; and (iii) the use of the halogen, halogen compound or active species (x) eventually causes corrosion of the circumferential wall of the film forming space, leading to generation of impurities, which might then be contaminated into a film to be deposited.

Accordingly, it has been expected eagerly to provide a method which makes it possible to stably form a large area polycrystalline film of high quality which excels in crystal orientation.

SUMMARY OF THE INVENTION

The principal object of the present invention is to solve the foregoing various problems in the known methods for forming a polycrystalline film by chemical vapor deposition process and to provide a method for forming a polycrystalline film satisfying the requirements and expectations described above.

Another object of the present invention is to provide a chemical vapor deposition method for efficiently forming a polycrystalline film, the film being useful as a constituent member of electronic elements such as semiconductor device and photovoltaic element, due to excellent electric properties, homogeneity and uniform thickness, and superior adhesion not only to a substrate but also to other deposited films.

Still another object of the present invention is to provide a chemical vapor deposition method for efficiently forming a polycrystalline film over a large area, the film containing crystal grains of a large grain size without containing impurities, being homogeneous and uniform in thickness and having a higher degree of the Hall mobility.

Through the experiments described hereinbelow, the present inventor has made studies in order to solve the foregoing problems in the known CVD methods for forming a polycrystalline film and in order to attain the above objects. Consequently, the inventors have obtained findings such that a desirable polycrystalline film, preferentially grown in a given orientation and of a high quality with a large crystal size, may be formed on a substrate, principally by contacting hydrogen gas with an activation energy to excite the gas, introducing the resulting active species (H) having an etching action for a deposited film to be formed, along with a film forming raw material gas having the property to chemically react with the active species (H) to form a deposited film, or with a precursor obtained from the raw material gas, into a film forming chamber wherein the substrate is arranged, and chemically reacting the active species (H) with the film forming raw material gas or the precursor, wherein the introduction of the active species into the film forming chamber is carried out such that the amount of the active species (H) fed onto the surface of a film being grown on the substrate is periodically made to change in order to change the growing speed of the film to be deposited on the substrate.

The present invention has been achieved based on the above findings which the present inventor has obtained through the experiments. The gist of the present invention is of the contents as described hereinbelow. That is, the present invention is characterized by exciting, in an activation chamber communicated with a film forming chamber where a substrate for film formation is arranged, hydrogen gas with an activation energy to generate active species (H), introducing the active species (H) thus generated into the film forming chamber, simultaneously generating a plasma region in the film forming chamber by introducing into the film forming chamber a film forming raw material gas or a precursor obtained by activating the raw material gas, and chemically reacting the active species (H) with the film forming raw material gas or the precursor, wherein film formation is performed in such manner that the distribution of the concentration of the active species (H) near the surface of the substrate is made to periodically change, thereby periodically changing the growing speed of a film to be deposited on the surface of the substrate.

According to the present invention thus constituted, crystalline in a given orientation is preferentially grown to efficiently form a desirable polycrystalline film on a substrate, said film containing crystal grains of a large size in a desirable state, without containing impurities, being homogeneous and uniform in thickness, having an excellent adhesion not only to the substrate but also to other deposited film, exhibiting a large Hall mobility, and thus being useful as a constituent element of electronic devices such as semiconductor devices, photovoltaic elements, etc.

The experiments performed by the inventor will now be explained hereinafter.

EXPERIMENT A

The present inventor has selected the method for forming a polycrystalline film, comprising introducing gaseous active species (H) consisting of hydrogen radical and a film forming raw material gas or a precursor obtained by exciting the raw material gas with an activation energy, having the property to chemically react with the active species (H) to form a deposited film, into a film forming space where a substrate is arranged, and subsequently reacting the gaseous active species (H) with the film forming raw material gas or the precursor. And the following experiments were performed, in order to investigate whether or not there causes some influences over the properties of a polycrystalline film to be formed on the substrate depending upon the relationship between the zone (referred to as "plasma zone" hereinafter) where there exists the gaseous active species (H) having an etching action and being formed in the film forming chamber and the position where the substrate is arranged.

Film formation was carried out in the present experiment by using a CVD apparatus of the configuration as schematically illustrated in FIG. 3(A). In FIG. 3(A), 309 represents a substantially enclosed reaction vessel capable of substantially maintaining an integral structure composed of a quartz activating chamber 309' and a quartz film forming chamber 309". An exhaust pipe 314, fixed at the end of the film forming chamber 309", is communicated through an exhaust valve 314' with an exhaust system such as turbo molecular pump (not shown in the figure). 307 represents a substrate holder, movable back and forth, which is arranged in the film forming chamber 309". 308 represents a substrate mounted on the substrate holder 307. 307' represents an electric heater to heat the substrate 308, and it is installed inside the substrate holder 307. 313 represents a microwave applicator which is arranged to underline the circumferential wall surface of the activating chamber 309'. A wave guide 313' extending from a source of microwave energy is connected to the microwave applicator 313. 304 represents a feed pipe made of a stainless-steel for introducing a raw material gas such as SiF$_4$ into the film forming chamber, of which end opens at a position inside the film forming chamber 309", with no influence of the microwave energy from the microwave applicator 313. To the raw material gas feed pipe 304 is connected a quartz conduit 301 extending from a raw material gas supply source (not shown in the figure). 303 represents an electric heater such as resistive heater, which is arranged to envelope the circumferential wall of the quartz conduit 301. The film forming raw material gas, once introduced into the quartz conduit 301, is heated to a temperature above 1000° C. by the electric heater 303 into an excited state to generate a precursor, which is then transported through the raw material gas feed pipe 304 into the film forming chamber 309", with no influence of the microwave energy applied by the microwave applicator 313. 302 represents a hydrogen gas feed pipe extending from a hydrogen gas ($H_2$) source (not shown in the figure) opening at a position upstream the activating chamber 309'. The hydrogen gas introduced through the hydrogen gas feed pipe 302 into an activating space 305 of the activating chamber 309' is excited by the microwave energy applied through the microwave applicator 313 into the activating space 305, to generate plasma containing active species. The plasma thus generated is then introduced sequentially into the film forming chamber 309" in order to produce the plasma region shown as the symbol 310.

The precursor transported through the raw material gas feed pipe 304 is discharged from the opening of the raw material gas feed pipe 304 at a position 306 inside the film forming chamber 309", where the precursor is mixed and contacted with the active species of hydrogen plasma, generated in the activating space 305 of the activating chamber 309' and transported into the film forming chamber, to cause chemical reaction resulting in forming a deposited film on the substrate 308.

311 is a plasma detector, which is arranged in a freely movable and slidable manner on the circumferential wall of the film forming chamber 309". In the detector 311, there are disposed slits of 1 mm (width)×10 mm (length)×10 mm (depth) in size so as to form two pores at a 10 mm interval, and at the opposite position facing the two pores are arranged probes 311" composed of optical fibers. Each probe 311" is electrically connected through a spectrum analyzer to a feedback circuit, which is electrically connected to a microwave power source. The plasma detector 311 is located at a position corresponding to the near end of the plasma region described above on the circumferential wall of the film forming chamber 309", whereby the presence of the emission light having an emission peak at 486 nm is detected, by ma¹ ng the emission light from the hydrogen radicals present in the plasma pass through the pores of the slits 311', detecting the emission light with the probes 311", and inputting the detected signals into the spectrum analyzer. The signals resulting from the detection is inputted into the feedback circuit, where the necessity of a feedback is judged. In the case where the feedback is required, a feedback signal is reflected over the microwave power source to regulate the microwave energy output from the microwave power source. More specifically, when the end of the plasma region 310 produced in the film forming chamber 309" resides at a predetermined position, namely, between the two probes of the plasma detector, a signal is outputted only from the spectrum analyzer connected to the left probe while no signal is outputted from the spectrum analyzer connected to the right probe. In this case, a signal outputted is transmitted to the feedback circuit, but a feedback signal is not transmitted from the feedback circuit to the microwave power source. Therefore in this case, the microwave energy from the microwave power source is maintained as it is.

When the end of the plasma region 310 resides upstream the predetermined position due to the small area of the plasma region 310, the emission light from hydrogen radicals does not reach the plasma detector 311, so that neither the left nor right spectrum analyzers transmits a signal to the feedback circuit. In this case, a command signal to increase the microwave output power is transmitted from the feedback signal to the microwave power source to increase the microwave output power from the microwave power source, and as a result, the plasma region 310 is expanded in the downstream to bring the end thereof to the predetermined position. When the plasma region 310 expands downstream, that is, the end of the microwave region expands over the predetermined position, the two spectrum analyzers both transmit signals to the feedback circuit. In this case, a command signal to decrease the microwave output power is transmitted from the feedback circuit to the microwave power source, leading to the reduction in the microwave output power from the microwave power source. In such manner, the state of the plasma region 310, which is produced in the film forming chamber 309", is automatically controlled, in appropriate manner.

312 represents a Langumuir probe which is arranged above the opening of the raw material gas feed pipe 304 in the film forming chamber 309" and of which the electrodes pass hermetically through the circumferential wall of the film forming chamber to be immersed in a plasma. The Langmuir probe, being connected to a circuit including a bias source, an ammeter, and a voltmeter, is constituted such that by applying a bias voltage to the electrodes present in the plasma, an electron temperature in the plasma can be measured on the basis of the relationship of an electric current flowing into the electrodes.

EXPERIMENT A-1

Under the film forming conditions shown in Table 1, using the foregoing apparatus shown in FIG. 3(A), a polycrystalline film was formed on the surface of a plane substrate 308 mounted on the substrate holder 307. That is, firstly, a glass plate of a size 20 mm (width)×60 mm (length)×1 mm (thickness), manufactured by Corning Glass Works, Article No. 7059, was produced. The glass plate was fixed, laying its longer side in parallel with the gas flow, onto the substrate holder 307, in the way as depicted by numeral reference 308 in FIG. 3(A). Then, by actuating the exhaust system (not shown in the figure) after opening the exhaust valve 314', the inside of the reaction vessel 309 was evacuated to a vacuum degree of $10^{-5}$ Torr. The electric heater 307' was actuated to heat the glass plate to 350° C., which was maintained at that temperature. Subsequently, $SiF_4$ was introduced at a flow rate of 100 sccm into the quartz conduit 301 maintained at 1000° C. by the electric furnace 303, and the gas was then transported through the gas feed pipe 304 into the film forming chamber 309". Concurrently, $H_2$ gas and Ar gas were introduced through the gas feed pipe 302 into the activating chamber 309' at respective flow rates of 200 sccm and 70 sccm, and the two gases were transported into the film forming chamber 309". By regulating the opening of the exhaust valve 314', the pressure inside the reaction vessel 309 was brought to about 0.05 Torr. When the individual flow rates of the three gases ($SiF_4$ gas, $H_2$ gas and Ar gas) became stable at the values defined above, the microwave power source was switched on to couple the microwave energy of 300 W into the activating chamber 309' through the microwave applicator 313. A plasma was generated in the activating chamber 309', and the plasma region was expanded into the film forming chamber 309". As a result of observing the end of the plasma in the film forming chamber 309" by the spectrum analyzers shown in FIG. 3(A), it was situated at a position (namely, at the end of the glass plate on the side of the activating chamber 309') 20 mm apart from the left end of the glass plate (substrate 308) mounted on the substrate holder 307. An electron temperature in the plasma was measured by the Langumuir probe 312 shown in FIG. 3(A). It was 3.9 eV.

Film formation was continued for one hour, while holding the end of the plasma region expanding in the film forming chamber 309" at the position described above, by regulating the microwave power coupled into the activating chamber 309' through the feedback circuit, as has been mentioned above.

The foregoing film forming conditions were collectively shown in Table 1.

After completion of the film formation, the microwave power source was turned off, the introduction of the three raw material gases were terminated, the electric furnace 303 was turned off, and the glass substrate 308 was cooled to ambient temperature, which was then taken out from the system. The glass substrate was cut along its longer side into sections, each in a 10 mm length, to obtain six samples. The deposited films on the individual samples were observed in terms of film thickness, film crystallinity and crystal grain size in the film. The film thickness was measured by a feeler-type film thickness instrument (product name; Alpha Step 200, manufactured by Tinker Instrument Co., Ltd.). Crystallinity was observed by measuring a peak intensity of X ray diffraction at $2\theta=47.3°$ (CuKα is used as the source) with a X ray diffractometer (product name; RAD IIB, manufactured by Rigaku Denki K. K.). The crystal grain size was observed by measuring the size of each of 30 crystal grains within a visual field by using an electron microscope (product name: S-530, manufactured by Hitachi Co., Ltd.) and by examining the mean value of the sizes of 30 crystal grains.

The results of measurement of film thickness were shown graphically in FIG. 4(A). The results of measurement of crystallinity were shown graphically in FIG. 4(B), where relative values were calculated to the peak intensity of X ray diffraction of the deposited film of the 10 mm-long sample obtained by cutting the glass substrate at a position 30 mm from its left end, the peak intensity being designated 1, and the values were plotted in graphs.

The results of the observation with respect to crystal grains were shown graphically in FIG. 4(C).

EXPERIMENT A-2

An polycrystalline silicone film was formed on the surface of a glass substrate of a size 20 mm (width)×60 mm (length) ×1 mm (thickness)(manufactured by Corning Glass Works, Article No. 7059), fixed on the substrate holder 307, following the same procedures of Experiment A-1, except that the microwave energy coupled into the activating chamber 309' was not regulated through the foregoing feedback circuit.

Regarding the polycrystalline silicone film formed on the glass substrate, the thickness and crystallinity of the film, and the crystal grain size in the film were observed in the same manner as in Experiment A-1.

The results of measurement of the thickness were shown graphically in FIG. 4(A). The results of measurement of the crystallinity were depicted graphically in FIG. 4(B), where relative values were calculated to the peak intensity of X ray diffraction of the deposited film of the 10 mm-long sample obtained by cutting the glass substrate at a position 30 mm from its left end, the intensity being designated 1, and the values were plotted in graphs. The observed results with respect to the crystal grain size were shown graphically in FIG. 4(C).

Discussions Based on the Results of Experiment A

The results shown in FIG. 4(A) indicate the followings. Regardless of the control of the expansion state of the hydrogen plasma (referred to simply as "plasma" hereinbelow) from the activating chamber into the film forming chamber, the deposition state of the film on the substrate arranged in the film forming chamber is almost the same; the portion closest to the activating chamber, in other words, at the portion of a higher plasma density, the etching action is facilitated more intensely and almost no film deposition occurs; and, at the portions as they become remote from the activating chamber, namely as there occur more reduction in the plasma density, film deposition is enhanced.

However, as the results shown in FIGS. 4(B) and 4(C) illustrate, a significant difference is caused between the quality of a film to be formed in the case where it is formed while holding the end of the plasma region produced in the film forming chamber at the predetermined position (Experiment A-1) and the quality of a film to be formed in the case where it is formed without controlling said end (Experiment A-2). In other words, in the former case, the film formed at the end of the plasma region becomes such that is not so large in the peak intensity of X ray diffraction, is of a small crystal grain size and not good in crystallinity; but the films formed at the positions as they are apart from said end become such that are large in the peak intensity of X ray diffraction, are large in the crystal grain size, and good in the crystallinity. The film formed at the position 10 mm apart from the end of the plasma region is a polycrystalline film of an extremely good quality which exhibits the largest peak intensity of X ray diffraction and is of the largest crystal grain size (4000 Angstroms). Regarding the film formed at the position over 10 mm apart and about 40 mm apart from the end of the plasma region, the peak intensity of X ray diffraction is small and the crystal grain size is small as well, namely, the crystallinity is not good. The film formed at the position more than 40 mm apart becomes amorphous.

On the other hand, in the latter case wherein the film is formed without regulating the end of the plasma region (namely, Experiment A-2), the end thereof produced in the film forming chamber is varied in a width of about 20 mm, and film formation is initiated at the position of the plasma density getting smaller, i.e. at the position about 20 mm part from the side of the activating chamber in the longitudinal direction with respect to the substrate. And the films formed at the positions of about 20 mm to about 40 mm become such that are not so large in the peak intensity of X ray diffraction and are of about 2000-Angstrom crystal grain size which is not good in the crystallinity. The films formed at the positions over 40 mm are such that are small in the peak intensity of X ray diffraction, are even worse in the crystallinity as being mall in crystal grain size, and are amorphous.

Consequently, for any of the films formed in the latter case, there is not such a case as in the former case that becomes the largest with respect to the peak intensity of X ray diffraction and the crystal grain size, and there is a significant difference with respect to the film quality in comparison with the polycrystalline films formed in the former case which are the largest with respect to the peak intensity of X ray diffraction and the crystal grain size. However, in the latter case, it is possible to form a polycrystalline film of a practically applicable film quality in the wide range in the longitudinal direction of the substrate.

EXPERIMENT B

The following findings were confirmed in Experiment A: (i) when film formation is carried out by controlling the expansion state of the plasma region from the activating chamber into the film forming chamber to hold the end thereof at the predetermined position by way of regulating the microwave power applied into the activating chamber, the film deposited at a specific position of the substrate becomes a polycrystalline film excelling in the quality, exhibiting an extremely large peak intensity in X ray diffraction and having a very large crystal grain size; and (ii) when film formation is carried out without controlling the end of the plasma region extending from the activating chamber into the film forming chamber, a practically applicable polycrystalline film can be obtained over the wide range of the substrate, in the longitudinal direction.

Based on those facts (i) and (ii), the present inventor attempted to periodically move within a given range the end of a plasma region to be produced in the film forming chamber to form a film in the former case.

As the apparatus for film formation, there was used an apparatus shown in FIG. 3(C), comprising the apparatus in the preceding FIG. 3(A), with a plasma detector being added. In other words, the different point of the apparatus shown in FIG. 3(C) from that shown in FIG. 3(A) is that two plasma detectors 311-1 and 311-2, respectively having the same configuration as that of the plasma detector 311 shown in FIG. 3(A), are arranged side by side in movable and slidable manner on the circumferential wall of the film forming chamber 309", as shown in FIG. 3(C). Each of these detectors is connected through a circuit composed of two spectrum analyzers and two feedback circuits to an output modulator, which is electrically connected to a microwave power source.

The plasma detector 311-1 was arranged so that the end of a plasma region produced in the film forming chamber 309" comes to situte at a position of about 1/6 fold distance of a substrate {20 mm (width)×60 mm (length)} in the longitudinal direction from the side of the activating chamber 309', and the plasma detector 311-2 was arranged so that the end of a plasma region produced in a film. forming chamber 309" comes to situate at a position of about 4/6 fold distance of the substrate in the longitudinal direction as well as in the above case.

The film forming conditions were made the same as in Experiment A-1, except the microwave power to be applied into the activating chamber 309'. The microwave power to be applied into the activating chamber 309' was made to periodically change between two stages of 250 W and 400 W, at 25 cycles/min. Consequently, the end of a plasma region produced in the film forming chamber 309" was made to situate at a position of about 1/6 fold distance of the substrate the longitudinal direction as above described in the case of applying microwave power of 250 W, whereas the end of said plasma region was made to situate at a position of about 4/6 fold distance of the substrate in the longitudinal direction in case of applying microwave power of 400 W.

In this way, film formation was carried out on a glass substrate (No. 7059 glass plate) of 20 mm (width)×60 mm (length)×1 mm (thickness) in size, manufactured by Corning Glass Works. The period for film formation was 1 hour. The measurement of electron temperature during the film formation indicated 3.2 eV in the case of applying the microwave power of 250 W, and 5.0 eV in the case of applying the microwave power of 400 W. The deposited film thus obtained was observed in terms of film thickness, peak intensity of X ray diffraction and crystal grain size (mean value), in the same manner as in Experiment A-1. The observed results of the film thickness were shown graphically in FIG. 5(A). The observed results of the peak intensity in X ray diffraction were shown graphically in FIG. 5(B), where relative values were calculated to the highest value shown in FIG. 4(B) defined as 1. The observed results of the crystal grain size were shown in FIG. 5(C). Discussions based on the results obtained in Experiment B.

The results shown in FIGS. 5(A), 5(B) and 5(C) indicate the followings. That is, in the case of performing film formation by periodically changing the expansion of the plasma region produced in the film forming chamber on the basis of periodical changes in the microwave power applied in the activating chamber, the state of a film to be deposited on the glass substrate is similar to that in Experiment A. Particularly, at the position closest to the activating chamber, etching is promoted in superior manner and almost no film deposition occurs, but at the positions being remote from the activating chamber, film deposition is enhanced. As for the quality of a film deposited on the glass substrate, there is initiated, at a position on the substrate which is slightly over about 10 mm apart from the end of the plasma region produced in film forming chamber, deposition of a polycrystalline film of an identical quality to that of the film exhibiting the largest peak intensity in X ray diffraction and having the largest crystal grain size shown in FIGS. 4(B) and 4(C) which were confirmed in Experiment A-1, and even at a position being about 30 mm apart from said end, there is deposited the foregoing high quality polycrystalline film. According, as described above, in the case where the microwave power applied into the activating chamber is made to periodically change, whereby periodically changing the expansion of the plasma region to be produced in the film forming chamber, a high quality polycrystalline film may be formed on a large area substrate.

EXPERIMENT C

In this Experiment, based on the results obtained in Experiments A and B, the state of film deposition on a substrate was observed while changing the relative positional relationship between the end of a plasma region produced in the film forming chamber and the substrate.

The film formation in this Experiment was carried out by using an apparatus of the constitution schematically shown in FIG. 3(B). The apparatus shown in FIG. 3(B) has the same configuration as that of the apparatus shown in FIG. 3(A), except that a substrate is held vertically to the gas flow so as to exhaust the gas downward. 318 represents a substrate holder mounted at the top portion of a transfer shaft 319, capable of moving back and forth through a driving means, if necessary. 315 represents a substrate arranged on the surface of the substrate holder 318. 318' represents a heater for heating the substrate 315 to a predetermined temperature. 317 represents a stainless-steel flexible wall, integrally constituted through an O-ring along with the circumferential wall of a film forming chamber 309" made of quartz, in order that the transfer shaft 319 may move back and forth on the circumferential back wall of the film forming chamber 309", while keeping the sealing condition of the film forming chamber 309". 316 represents an exhaust pipe communicated with an exhaust apparatus (not shown in the figure). 316' is an exhaust valve, arranged in the exhaust pipe 316.

In FIG. 3(B), the symbol "a" represents the distance between the surface of the substrate 315 and the opening of a raw material gas feed pipe 314 into the film forming chamber 309, and the symbol "b" represents the distance between the surface of the substrate 315 and the end of a plasma region 310.

In the present Experiment, a No. 7059 glass plate of 50 mm (width)×50 mm (length)×1 mm (thickness) in size, manufactured by Corning Glass Works, was used as the substrate 315.

Following the procedures of Experiment A, film formation was carried out under the film forming conditions shown in Table 2, except that the distance between the "a" and the "b" was changed as shown in Table 3, and that the microwave power applied into the activating chamber 309' was changed as shown in Table 3, to thereby obtain 16 samples of deposited films (Sample Nos. 301 to 316).

The electron temperature in the plasma during the formation of each of the 16 deposited film samples was measured in the same manner as in Experimental A-1. The results were shown in Table 3.

For each of the resultant deposited film samples, there were observed film thickness, crystallinity, uniformity and Hall mobility. The film thickness and crystallinity of the film were observed in the same manner as in Experiment A-1, and the results obtained were shown in Table 3. The crystallinity of the film was shown in Table 3, as "present" when a peak appeared in X ray diffraction at a crystalline angle $2\theta = 47.3°$ or "absent" when the peak did not appear. The observation of the film uniformity was carried out as follows; film thickness was firstly measured at 4 points 5 mm inside from each side of the substrate and at the center thereof, following the same procedures as in Experiment A-1. In Table 3, the case where the coefficients of variation of the film thickness measured at the 5 points are less than is represented as "○" and the case where variation are more than said figure are represented as "X". The Hall mobility was measured according to the Van Der Pauw method, and the results observed were shown in Table 3.

Discussions of the Results Obtained in Experiment C

The results shown in Table 3 indicate the followings. That is, in the case where the microwave power applied into the activating chamber 309" is low and the electronic temperature in the plasma is low, film deposition preferentially proceeds with a high film growing speed, but the resulting deposited film becomes such that does not have crystallinity or is inferior in crystallinity. In the case where the microwave power applied into the activating chamber 309' is high and the electronic temperature in the plasma is high, the substrate is exposed to plasma, where no film deposition occurs. In the case where the microwave power applied into the activating chamber 309" is proper, a relatively good balance is provided between the crystallinity and the growing speed of the film to be deposited, but the film obtained is not satisfactory with respect to uniformity. As Table 3 illustrates, a satisfactory film may be obtained under extremely limited film forming conditions.

EXPERIMENT D

In this Experiment, film formation was performed, employing the individual film forming conditions for the three deposited film samples Nos. 13, 15 and 19, and using the apparatus shown in FIG. 3(B) and $Cl_2$ known as a gas having an etching action, in addition to $H_2$ gas and Ar gas. As for the $Cl_2$ gas, there was provided $Cl_2$ gas diluted with $H_2$ gas to 500 ppm, namely $Cl_2/H_2$ gas (=500 ppm). The flow of the $Cl_2/H_2$ gas was adjusted as shown in Table 4, and it was introduced together with $H_2$ gas and Ar gas through the feed pipe 302 into the activating chamber 309'. The film forming conditions other than those described above, were made as shown in Table 2. In this way, there were prepared 6 deposited film samples (samples Nos. 401 to 406) as shown in Table 4.

For each of the deposited film samples thus obtained, film thickness, crystallinity and uniformity of the film, and Hall mobility were observed in the same manner as in Experiment C. The results of the observation are shown in Table 4 as in Experiment C.

Discussions on the Results Obtained in Experiment D

The results shown in Table 4 indicate the followings. That is; in the case where the electron temperature in plasma is 2.5 or 4.1 eV (i.e. in the case of the sample No. 303 or 305) in Experiment C, there is observed neither crystallinity nor Hall mobility for the deposited films. However, there is observed both crystallinity and Hall mobility for the films deposited with the introduction of $Cl_2$ gas, wherein the films are, however, contaminated with impurities and their Hall mobilities are not satisfactory. In the case where the electron temperature in plasma is 5.2 eV (i.e. in the case of the sample No. 309) in Experiment C, there is observed both crystallinity and satisfactory Hall mobility for the deposited film. However, said Hall mobility of the deposited film is remarkably reduced to be unsatisfactory when $Cl_2$ gas is introduced upon its formation. As for the thickness of the film to be deposited, it is decreased in any case, compared with the cases of Experiment C.

Impurities in the deposited film sample No. 305 obtained in Experiment C and the deposited film sample No. 402 obtained in Experiment D were analyzed by SIMS. Any impurity was not detected for the former sample, while Cr was detected at 20 ppm for the latter sample. This situation is considered such that Cr is released from the stainless steel member in the inside structure of the reaction vessel 309 due to Cl radicals to contaminate into the film.

From the foregoing results obtained in Experiments A to D, the followings were recognized.

In the case of simultaneously introducing an active species (H) having an etching action which is generated by exciting hydrogen gas with an activation energy such as microwave energy and a gaseous compound (namely, a film forming raw material gas) containing an element to be a constituent of a film to be formed which reacts with the active species (H) or a precursor generated by exciting the film forming raw material gas with an activation energy such as thermal energy into a film forming space wherein a substrate on which a film to be deposited is placed producing a plasma region in the film forming space, and periodically repeating the procedures of exposing and unveiling the substrate to the plasma in the plasma region, there is established interchangeably the state where film deposition superiorly proceeds and the state where the etching of the film proceeds superiorly than the film deposition, resulting in preferential growth of the face orientation of crystalline which is advantageous for growth of the film, whereby forming a desirable polycrystalline film containing crystal grains of a large grain size, without containing impurities.

BRIEF DESCRIPTION OF THE DRAWINGS

FIG. 1 is a schematic explanatory view of a CVD apparatus suitable for practicing the method for forming a polycrystalline deposited film by the chemical vapor deposition process in accordance with the present invention.

FIGS. 5(A) to 5(C) are the graphs illustrating the individual results obtained in Experimental A-2.

FIG. 6 is a schematic explanatory view of the relation between the etching mode and the deposition mode, both being repeated in the method of the present invention.

FIGS. 8(A) to 8(E) are schematic explanatory views of the process of forming a polycrystalline deposited film in Example 5 of the present invention.

DETAILED DESCRIPTION OF PREFERRED EMBODIMENTS

Figure 2A:
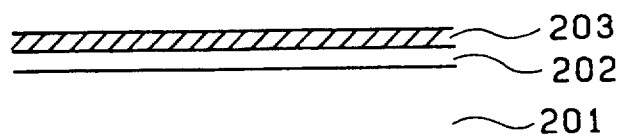
FIGS. 2(A) to 2(G) are schematic explanatory views of the process for selectively forming a polycrystalline deposited film by the method in accordance with the present invention.
Figure 2B:
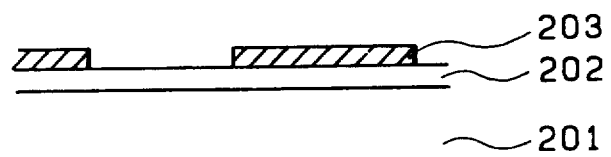
Figure 2C:
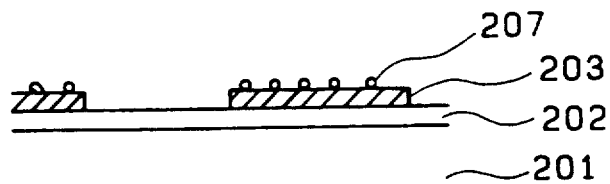
Figure 2D:
Figure 2E:
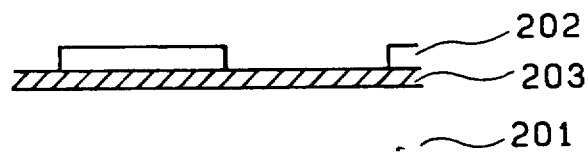
Figure 2F:
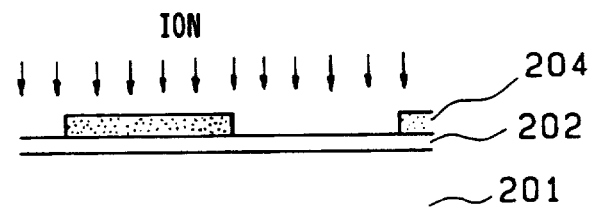
Figure 2G:
Figure 3A:
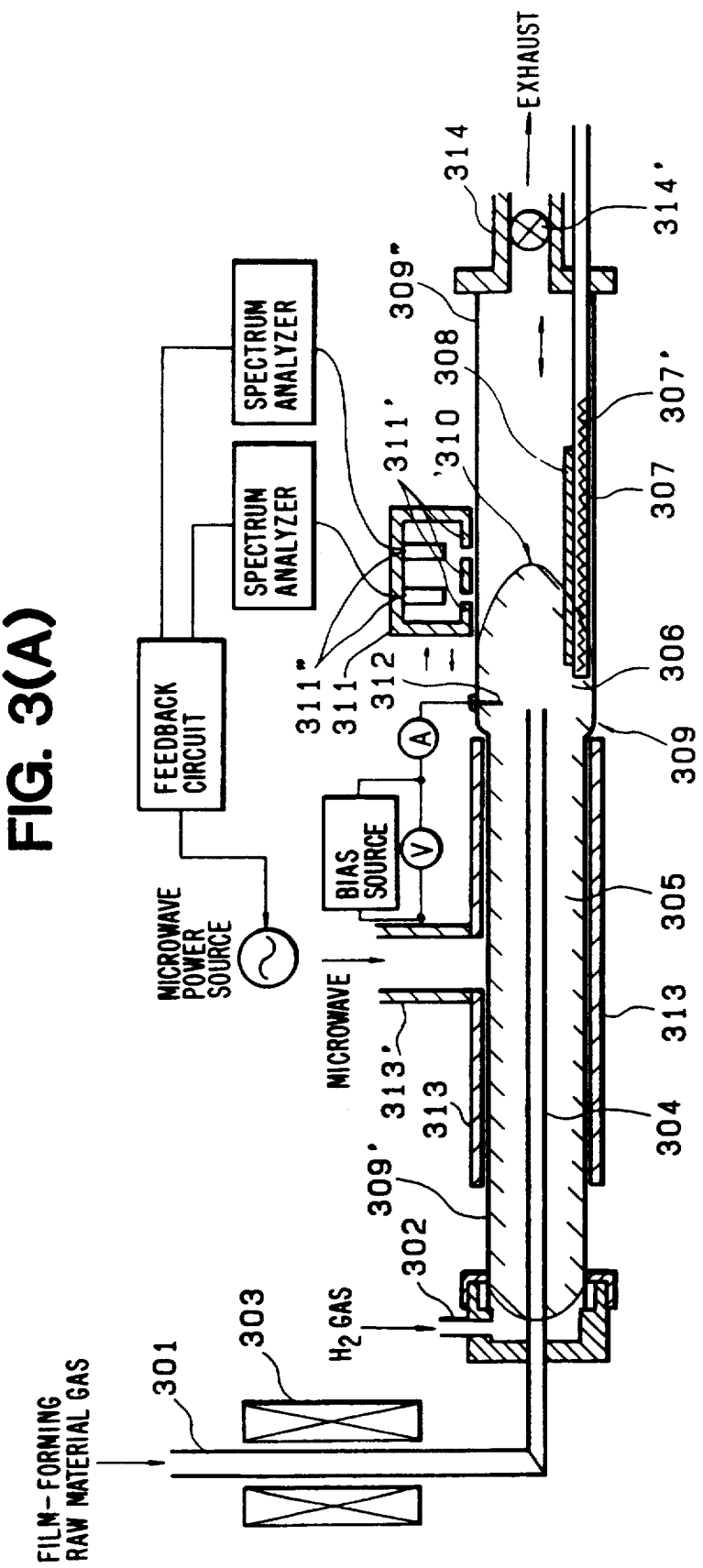
FIGS. 3(A) to 3(C) are schematic explanatory views of CVD apparatuses used in the experiments described in the present specification.
Figure 3B:
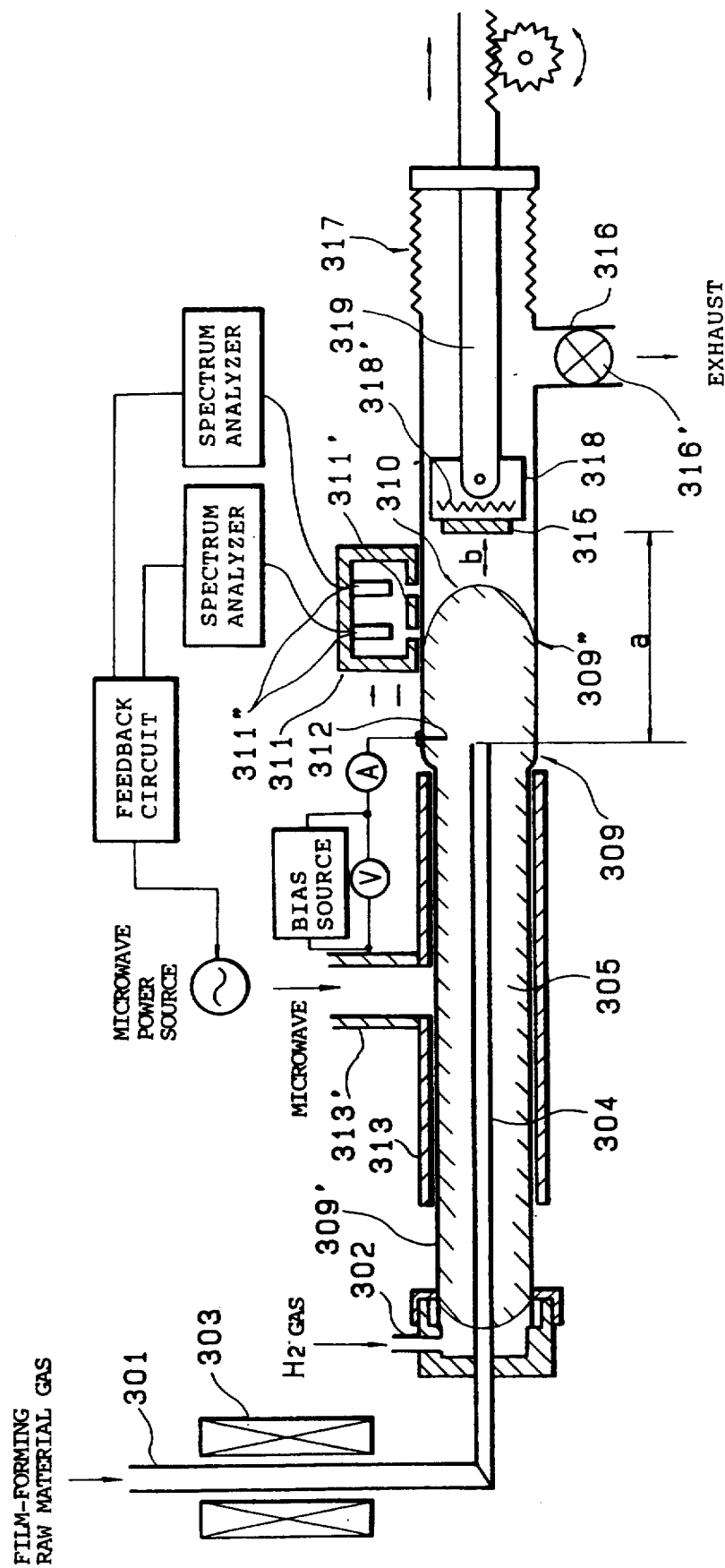
Figure 3C:
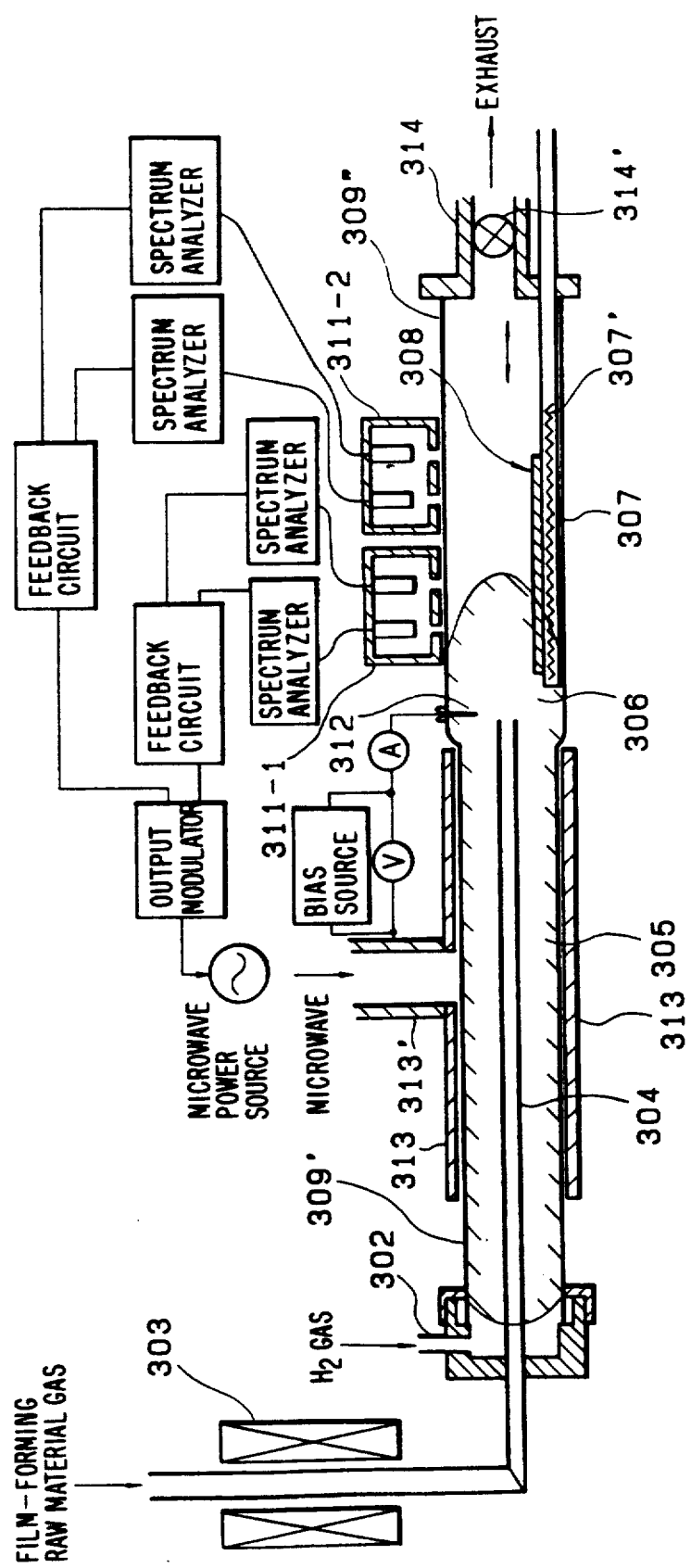
Figure 4A:
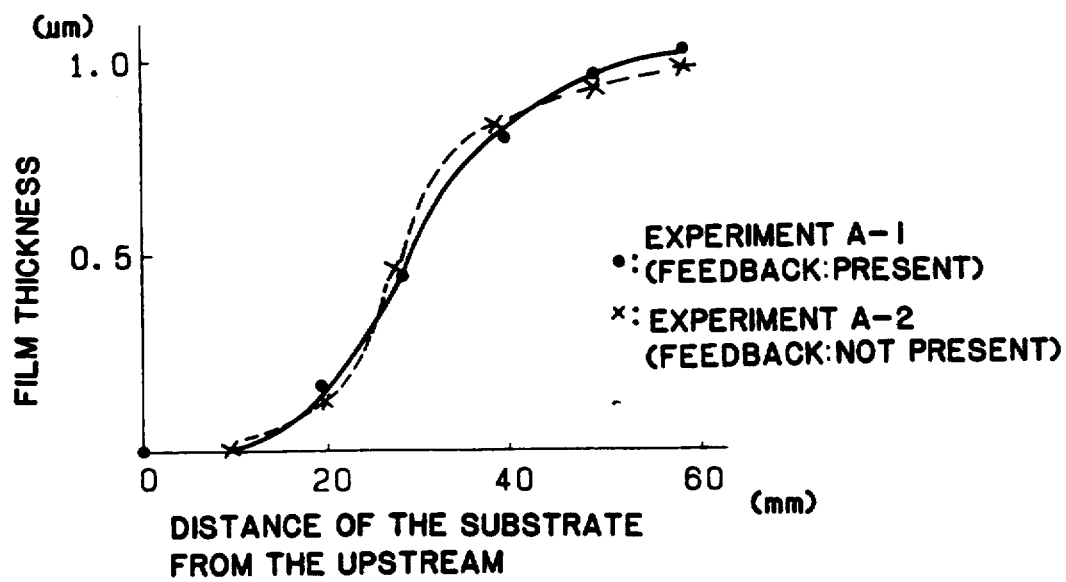
FIGS. 4(A) to 4(C) are the graphs illustrating the individual results obtained in Experimental A-1 described in the specification.
Figure 4B:
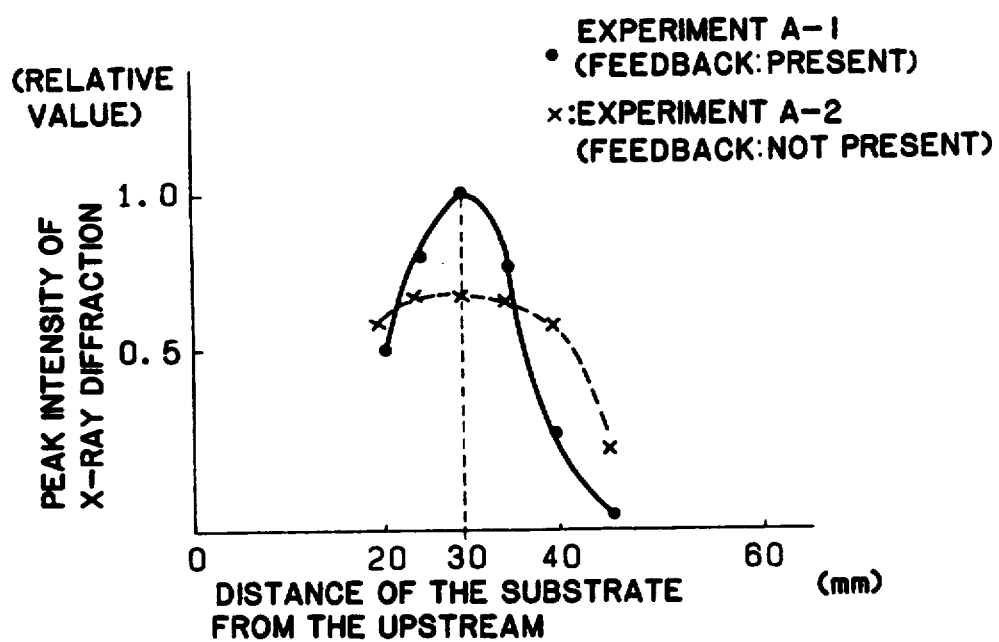
Figure 4C:
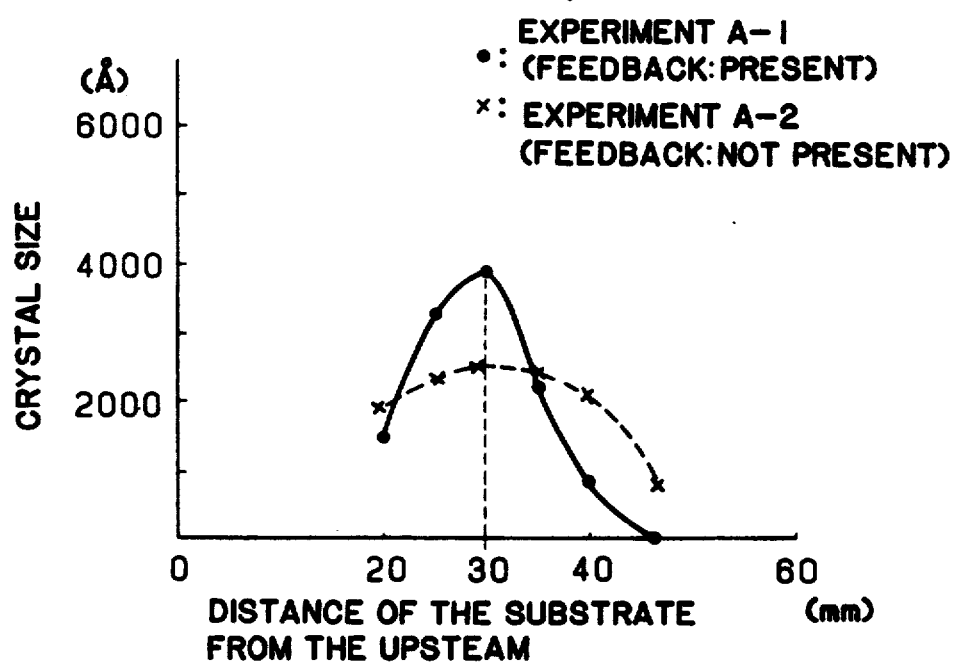
Figure 5A:
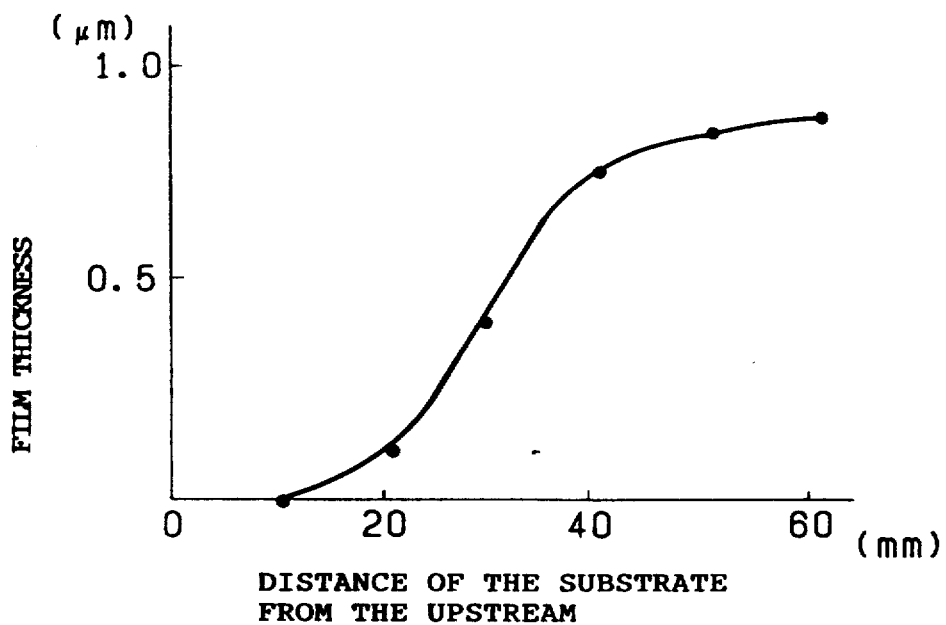
Figure 5B:
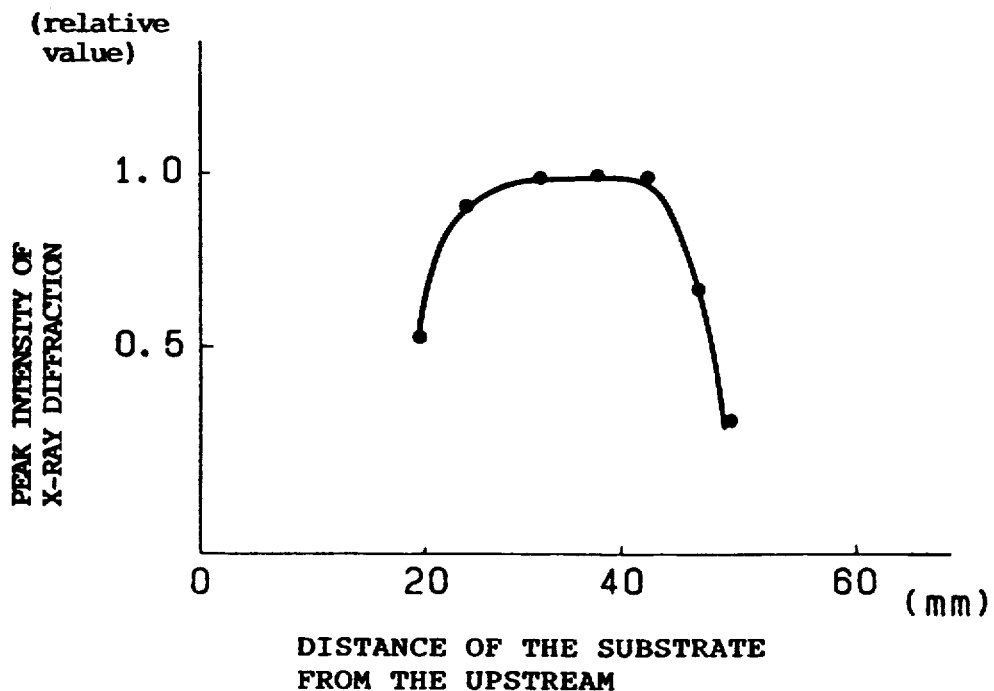

The method for forming a polycrystalline film by the CVD method according to the present invention is characterized by using hydrogen gas and a film forming raw material gas; exciting the hydrogen gas with an activation energy such as microwave energy in a space (i.e. an activating space of an activating chamber) different from a film forming space of a film forming chamber wherein a substrate is arranged on which a film to be formed, to thereby form an active species (H) having an etching action; introducing the active species (H) into the film forming space; at the same time, introducing the film forming raw material gas or a precursor, which is generated by exciting the film forming raw material gas with an activation energy in a space (i.e. a precursor generating space) different from both of the film forming space and the hydrogen gas activating space, into the film forming space by way of another route different from the route for introducing the active species (H); mixing and contacting the active species (H) with the film forming raw material gas or the precursor to produce a plasma region; and periodically repeating the intermittent exposure of the substrate to the plasma in the plasma region, to thereby form a film.

A preferred embodiment of the procedure of repeating the periodical exposure of the substrate to the plasma in the plasma region is carried out, as was performed in the foregoing Experiment B, by periodically changing the output power of from a power source for an activation energy (microwave energy) to be applied onto the hydrogen gas between a low degree and a high degree, thereby periodically increasing and decreasing the generated amount of the active species (H) having an etching action. In this procedure of the present invention, the increase in the amount of the active species (H) having an etching action, which is generated from hydrogen gas, correspondingly provides expansion of the plasma region to be produced in the film forming space to cause the substrate to expose to the plasma, so that on the surface of the substrate is generated the state where etching is effected superiorly than film deposition thereon (this state will be referred to as "State A" hereinafter). On the other hand, the decrease in the amount of the active species (H) correspondingly provides reduction in the expansion of the plasma region in the film forming space to result a state wherein the surface of the substrate does not expose to the plasma, so that film deposition onto the surface of the substrate proceeds superiorly to provide a state where film deposition occurs on said surface (this state will be referred to as "State B" hereinafter). In the State A, the film deposited on the surface of a substrate is etched by a plasma, so that crystallines in a given face orientation are left on the surface of the substrate. In the State B, film deposits on the surface of the substrate where the crystallines in a given face orientation are left, the face orientation of the crystallines grows preferentially. In the present invention, the States A and B are interchangeably repeated to cause the formation of a desirable polycrystalline film containing crystal grains of a large grain size.

When the cycle of repeating the States A and B, namely, the modulation cycle of an output power source for the activation energy which is applied in the activating space in order to generate the active species (H) from hydrogen gas, is too short, the change of the plasma region cannot follow the output power change and as a result, there is not provided a desirable plasma region to cause a breakpoint between the States A and B. In this case, the preferential crystalline growth in a specific orientation and the increase in the crystal grain size are not brought about. Thus, there cannot be obtained a polycrystalline film of good quality, containing crystal grains of a large crystal grain size, which is intended to provide by the present invention. When the modulation cycle of the output power source is too long, the state of film deposition (i.e. the State B) continues for a undesirably long period of time and because of this, the State B transfers to the etching state (i.e. the State A) in the growing progress of crystal grains, thereby reducing the aforementioned etching effect. Consequently, no preferential crystalline growth in a specific orientation does not occur. Therefore, as well as in the former case, it is difficult to obtain a polycrystalline film of a good quality, containing crystalline grains of a large grain size.

Therefore, the modulation cycle of the output power source, in the present invention is preferably 5 to 30 cycles/min, more preferably 10 to 25 cycles/min.

The aforementioned States A (etching mode) and B (deposition mode) generated by the periodical modulation of the output power source (microwave power source) in the present invention can be explained as those provided in the pulse wave form schematically shown in FIG. 6. In a preferred embodiment, the States A (etching mode) and B (deposition mode) are repeated in the way illustrated with solid lines in FIG. 6. These states are actually repeated as shown with dotted lines.

In order to interchangeably provide the State A (etching mode) and the State B (deposition mode) on the surface of the substrate, it is possible to employ another method comprising making the substrate holder move back and forth while fixing the plasma region to thereby change the relative positional relationship between the plasma region and the substrate. In this case, the substrate holder may be moved back and forth through the substrate-holder by a driving apparatus situated outside the vacuum system. The cycle of moving back and forth the substrate in this case is preferably 5 to 100 cycles/min, more preferably 10 to 40 cycles/min. The range of moving back and forth the substrate is preferably 0 to 4 cm, more preferably 0 to 2 cm, from the plasma region.

According to this method, the balance between the States A and B may be easily maintained even at a rapid cycle, compared with the case of modulating the plasma output. However, it should be noted that the rapid movement within the vacuum system may cause to generate dust within the reaction chamber, eventually generating pin holes in a film to be obtained.

The temperature of the substrate upon forming a desirable polycrystalline film thereon according to the method of the present invention varies more or less depending on the kind of a film forming raw material gas to be used. However, in general, it is preferably 50° to 600° C., most preferably 150° to 450° C.

The inner pressure in the film forming space of the film forming chamber upon film formation is preferably $1 \times 10^{-3}$ to 1 Torr, more preferably $1 \times 10^{-2}$ to $1 \times 10^{-1}$ Torr.

The active species having an etching action in the present invention is principally generated by introducing hydrogen gas into the activating chamber and applying an activation energy (microwave energy) into said chamber to contact the activation energy with the hydrogen gas to thereby excite the hydrogen gas. At that time, in addition to the hydrogen gas, it is possible to introduce an inert gas such as argon gas (Ar gas) and helium gas (He gas) into the activating chamber, wherein it is excited together with the hydrogen gas with the action of the activation energy to thereby generate active species (H) having an etching action, and introduce the active species (H) into the activating space of the activating chamber. In this case, discharge to decompose the hydrogen gas in the activating chamber is stabilized and the a plasma region produced in the film forming space of the film forming chamber is stabilized.

In the method of the present invention, the film forming raw material gas to be introduced into the film forming space of the film forming chamber may be introduced into the film forming space as it is. In a preferred embodiment, the film forming raw material gas is contacted with a suitable activation energy in an activating chamber different from the hydrogen gas activating chamber to thereby decompose the film forming raw material gas to generate a precursor, followed by introducing into the film forming space.

The activation energy may be any energy such as electric energy including high-frequency energy, thermal energy or light energy.

According to the method of the present invention, various kinds of polycrystalline semiconductor films may be formed efficiently. As such polycrystalline semiconductor film, there can be illustrated, for example, a polycrystalline semiconductor film containing an element of the group IV of the periodic table as a matrix (hereinafter referred to as "group IV polycrystalline semiconductor film"), a polycrystalline semiconductor film containing elements of the groups II and VI of the periodic table as matrixes (hereinafter referred to as "group II-VI polycrystalline semiconductor film"), a polycrystalline semiconductor film containing elements of the groups III and V of the periodic table as matrixes (hereinafter referred to as "group III-V polycrystalline semiconductor film").

The substrates to be used for forming the foregoing polycrystalline semiconductor film, following the method of the present invention, may be a single crystal substrate or a non-single crystal substrate. They may be conductive or electrically insulating.

Specific examples of such substrate can include metals such as Fe, Ni, Cr, Al, Mo, Au, Nb, Ta, V, Ti, Pt, Pb, etc., or alloys thereof, for example, with brass, stainless steel, etc.

In addition to those described above, there can include synthetic resins in a film or sheet form, including polyester, polyethylene, polycarbonate, cellulose acetate, polypropylene, polyvinyl chloride, polyvinylidene chloride, polystyrene, polyamide, polyimide, etc., glass and ceramics.

As the single crystal substrate, there can be illustrated single crystal substrates of Si, Ge, C, NaCl, KCl, LiF, GaSb, InAs, InSb, GaP, MgO, $CaF_2$, $BaF_2$, $\alpha$-$Al_2O_3$, etc., being sliced into wafers.

For example, in the case of forming a group IV polycrystalline semiconductor film, a compound containing silicon and halogen may be used. Specific example of such compound are compounds in gaseous state at normal temperature and pressure and easily gasifiable compounds such as $SiF_4$, $(SiF_2)_5$, $(SiF_2)_6$, $(SiF_2)_4$, $Si_2F_6$, $Si_3F_8$, $SiHF_3$, $SiH_2F_2$, $SiCl_4$, $(SiCl_2)_5$, $SiBr_4$, $(SiBr_2)_5$, $Si_2Cl_6$, $Si_2Br_6$, $SiHCl_3$, $SiH_3Cl_1$, $SiH_2Cl_2$, $SiHBr_3$, $SiHI_3$, $Si_2Cl_3F_3$, etc.

In the case of forming a group II-VI polycrystalline semiconductor film, there are used, as the film forming raw material gases, a compound in gaseous state at normal temperature and pressure or an easily gasifiable compound respectively containing a group II element as the constituent element (hereinafter referred to as. "group II compound"), and a compound in gaseous at normal temperature and pressure or an easily gasifiable compound respectively containing a group VI element as the constituent element (hereinafter referred to as "group VI compound").

In the case of forming a group III-V polycrystalline semiconductor film, there are used, as the film forming raw material gases, a compound in gaseous state at normal temperature and pressure or an easily gasifiable compound respectively containing a group III element as the constituent element (hereinafter referred to as "group III compound"), and a compound in gaseous state at normal temperature and pressure of an easily gasifiable compound respectively containing a group V element as the constituent element (hereinafter referred to as "group V compound").

Specific example of the aforementioned group II compound are dimethyl zinc (DMZn), diethyl zinc (DEZn), dimethyl cadmium (DMCd), diethyl cadmium (DECd), etc.

Specific example of the aforementioned group III compound are trimethyl aluminium (TMA1), triethyl aluminium (TEA1), triisobutyl aluminium (TBA1), trimethyl gallium (TMGa), triethyl gallium (TEGa), trimethyl indium (TMIn), triethyl indium (TEIn), triisobutyl indium (TBIn), etc.

Specific example of the aforementioned group V compound are phosphine ($PH_3$), tertiary-butyl phosphine (TBP), arsine ($AsH_3$), tertiary-butyl arsine (TBAs), etc.

Specific example of the aforementioned group VI compound are hydrogen sulfide, methylmercaptane ($CH_3SH$), ethylmercaptane ($C_2H_5SH$), propylmercaptane ($C_3H_7SH$), selenium hydride ($H_2Se$), dimethyl selenium (DMSe), diethyl selenium (DESe), etc.

In the case where the foregoing film forming raw material gas is decomposed with an activation energy into a precursor before introduction into the film forming chamber, the gas may be diluted with hydrogen gas or an inert gas (Ar gas or He gas) before introduction into the precursor-generating space.

The method of the present invention described above may be carried out by using an appropriate so-called HR-CVD (abbreviation of hydrogen assisted chemical vapor deposition) apparatus. A representative example of such apparatus is of the configuration shown schematically in FIG. 1.

The apparatus shown in FIG. 1 will now be explained. 109 represents a substantially enclosed reaction vessel made of quartz which is capable of substantially maintaining an integral structure composed of an activating chamber 109' and a film forming chamber 109" under vacuum. An exhaust pipe 113 is arranged at an end of the film forming chamber 109", and the exhaust pipe is communicated through an exhaust valve 113' with an exhaust system such as turbo molecular pump (not shown in the figure). 107 represents a substrate holder which is arranged on the tip of a transfer shaft 118 which is capable of moving back and forth and is arranged in the film forming chamber 109". The transfer shaft 108 moves back and forth through a sliding system arranged outside the system. 114 represents a stainless-steel flexible wall integrally constructed with the circumferential wall of the quartz film forming chamber 109" through an O-ring (not shown in the figure) which can enable the transfer shaft 118 to move back and forth along the circumferential wall of the film forming chamber 109" while maintaining the film forming chamber 109" under vacuum. 118 represents a substrate arranged on the substrate holder 107. 107' represents an electric heater arranged inside the substrate holder 107 to heat the substrate 108. 117 represents a microwave applicator arranged to underline the circumferential wall surface of the activating chamber 109'. A wave guide 117' extending from a microwave power source is connected to the microwave applicator 117. 104 represents a gas conduit for feeding a raw material gas (A) such as $SiF_4$, into the film forming space of the film forming chamber 109". The gas conduit 104 extends toward the film forming space, running horizontally in the center of an activating space 105 of the activating chamber 109', in parallel with the circumferential wall of the activating space, and the end of the conduit opens at the position where the film forming space starts. The gas conduit 104 is made of a conductive material such as stainless steel. The gas conduit 104 may be made of an insulating material such as quartz in case where necessary. In this case, the raw material gas (A) during passing through the gas conduit 104 is excited by microwave energy from the microwave applicator 117, which is coupled into the gas conduit. To the gas conduit 104 is connected a feed pipe 101 for the raw material gas (A) 116, extending from a raw material gas reservoir (not shown in the figure). 103 represents an electric heater such as resistive heater, which is arranged enveloping the circumferential wall of the feed pipe 101. The raw material gas (A) supplied through the feed pipe 101 is excited by the action of thermal energy from the electric heater to generate a precursor, which is successively supplied through the feed pipe 101 into the film forming chamber 109". In this case, the feed pipe 101 is made of a heat resistant material such as quartz, ceramics, etc. 102 represents a supply pipe extending from a reservoir (not shown in the figure) for a raw material gas (B) 115, which opens into the upstream position of the activating chamber 109'. The raw material gas (B) introduced through the raw material gas supply pipe 102 into the activating chamber 109' is activated in the activating space 105 by the action of microwave energy applied from the microwave applicator 117, to generate a plasma containing an active species. The plasma thus generated is introduced sequentially into the film forming chamber 109" to produce a plasma region shown by numeral reference 110.

The raw material gas (A) or a precursor generated by exciting the raw material gas (A) is transported through the raw material gas feed pipe 104 is released from the opening of the raw material gas feed pipe 104 at a position 106 inside the film forming chamber 109", where the gas or the precursor is mixed and contacted with the active species from the raw material gas (B), generated in the activating space 105 of the activating chamber 109' and transported thereinto, to cause chemical reaction among them, resulting in forming a deposited film on the substrate 108.

Plasma detectors are designated 111-1 and 111-2. The two detectors 111-1 and 111-2 are disposed side by side in a freely movable and slidable manner on the circumferential wall of the silm forming chamber 109". The two detectors 111-1 and 111-2 are of the same configuration. Therefore, explanation will be made on the plasma detector 111-1 below. In the detector 111, there are arranged slits 111-1' of 1 mm (width)×10 mm (length)×10 mm (depth) in size so as to form two pores at a 10 mm interval, and at the opposite position facing each pore is arranged a probe 111-1" composed of an optical fiber. Each probe 111-1" is electrically connected through a spectrum analyzer to a feedback circuit, which is electrically connected to the microwave power source. The plasma detector 111-1 is arranged at a position on the circumferential wall of the film forming chamber 109", the position being situated near the end of the plasma region described above, whereby the presence of the emission light having an emission peak at 486 nm is detected by the spectrum analyzer, by making the light emitted from hydrogen radicals present in the plasma to pass through the pores of the slits 111-1', detecting the emission light with the probes 111-1", and inputting the detected signals into the spectrum analyzer. The signals resulting from the detection are inputted into the feedback circuit, where the necessity of feedback is judged. In case where the feedback is required, a feedback signal is reflected over the microwave power source to regulate the microwave output from the microwave power source. Referring specifically, when the end of the plasma region 110 produced in the film forming chamber 109" resides at the predetermined position, namely, between the two probes of the plasma detector, a signal is outputted only from the spectrum analyzer connected to the left probe while no signal is outputted from the spectrum analyzer connected to the right probe. In this case, an outputted signal is transmitted to the feedback circuit, but a feedback signal is not transmitted from the feedback circuit to the microwave power source. Therefore in this case, the power of the microwave outputted from the microwave power source is maintained as it is.

When the end of the plasma region 110 resides upstream the predetermined position due to the smallness of the plasma region 110, the emission light from hydrogen radicals in the plasma does not reach the plasma detector, so that any of the left and right spectrum analyzers does not transmit a signal to the feedback circuit. In this case, a command signal to increase the microwave output power is transmitted from the feedback circuit to the microwave power source to increase the microwave energy from the microwave power source. When the plasma region 110 expands downstream, that is, the end of the microwave energy region expands beyond the predetermined position, the two spectrum analyzers transmit signals to the feedback circuit. In this case, a command signal to decrease the microwave output power is transmitted from the feedback circuit to the microwave power source to cause reduction in the outputted power from the microwave power source.

The other plasma detector 111-2 is of the same configuration as that of the foregoing plasma detector 111-1, and the signal transmission system from the plasma detector 111-2 is the same as that of the plasma detector 111-1. The two plasma detectors 111-1 and 111-2 are connected, individually through the two spectrum analyzers and two feedback circuits, to an output modulator, which is then electrically connected to the microwave power source.

Since the apparatus is constructed as described above, the position of the end of the plasma region 110 can be moved repeatedly between the optional two positions in the film forming space of the film forming chamber 109", corresponding to the timing of output modulation of the output modulator.

Particularly, a desirable position of the plasma region 110 is preliminary determined, and the microwave power at the position is measured. High and low microwave powers and the timing information about modulation thereof are inputted into the output modulator. Thereafter, the plasma detectors 111-1 and 111-2 are disposed at desirable positions of the plasma region 110, and the position of the plasma region 110 is regulated through the foregoing feedback system.

The positional relationship between the substrate 108 and the plasma region may be changed by repeating mechanical back and forth movement of the substrate holder 107 through the sliding mechanism outside the system, while fixing the plasma region 110.

112 represents a Langumuir probe which is arranged above the opening of the raw material gas feed pipe 104 in the film forming chamber 109" wherein electrodes pass hermetically through the circumferential wall of the film forming chamber and are immersed in the plasma. The Langmuir probe, being connected to a circuit including a bias source, an ammeter, and a voltmeter, is constructed such that by applying a bias voltage to the electrodes present in the plasma, an electron temperature in the plasma can be measured on the basis of the relationship of an electric current flowing into the electrodes.

EXAMPLES

The present invention will be explained more detailed with reference the following examples, but the invention is not limited to these Examples.

EXAMPLE 1

Film formation was performed following the film forming procedures of the foregoing Experiment B, under the film forming conditions shown in Table 5, using the apparatus shown in FIG. 1, to thereby form a polycrystalline silicon deposited film.

As the substrate 108, there was used a No. 7059 glass plate of 50 mm (width)×50 mm (length)×1 mm (thickness) in size, manufactured by Corning Glass Works.

The distance between the opening of the conduit 104 and the substrate 108 was made to be 6 cm. As the raw material gas (A) 116, $SiF_4$ gas was used. The $SiF_4$ gas was heated to 1100° C. by the electric heater 103, introduced at a flow rate of 100 sccm into the feed pipe 101 maintained at this temperature, and supplied through the conduit 104 into the film forming space of the film forming chamber 109". As the material gas (B) 115, $H_2$ gas and Ar gas were used. The two gases were introduced through the feed pipe 102 into the activating space 105 at respective flow rates of 200 sccm and 70 sccm. The application of microwave energy into the activating space 105 was carried out by modulating the output power from the microwave power source at two stages of 200 W and 500 W, at 25 cycles/min. At that time, the end of the plasma region to be formed in the film forming space of the film forming chamber 109" were modulated through the plasma detectors 111-1 and 111-2, to thereby interchangeably repeat the etching mode and the deposition mode in the pattern shown in FIG. 6. Particularly, regarding the plasma region formed in the film forming space of the film forming chamber 109", the end of the plasma region was to reach the surface of the substrate 108 at a 500 W output power of the microwave power source and the plasma region was to end at a position of about 2 cm apart from the substrate 108 at a 200 W output power of the microwave power source, by measuring the emission light of 486 nm from hydrogen radicals. In the two cases, the electron temperature of the plasma was measured by the Langumuir probe 112. The temperature was 60.0 eV in the former case, and it was 2.1 eV in the latter case. The film forming process was continued for 2 hours.

On the glass plate was formed a polycrystalline silicon deposited film. Of the deposited film, the film thickness, the size of crystal grain and the Hall mobility were observed. The film thickness was observed in the same manner as in the foregoing Experiment A-1. The film thickness was 1.1 μm. The size of crystal grain in the film was observed in the same manner as in the foregoing Experiment A-1. As a result, the size was 5000 Angstroms. The Hall mobility was observed according to the Van Der Pauw method. As a result, the mobility was found to be 120–140 $cm^2$/v.sec almost all over the whole film, indicating that the film is a polycrystalline film of extreme homogeneity.

EXAMPLE 2

Film formation was performed following the film forming procedures of the foregoing Experiment B under the film forming conditions shown in Table 6, using the apparatus shown in FIG. 1, to thereby form a polycrystalline film of ZnSe.

As the substrate 108, there was used a No. 7059 glass plate of 50 mm (width) × 50 mm (length) × 1 mm (thickness) in size, manufactured by Corning Glass Works. The distance between the opening of the conduit 104 and the substrate 108 was made to be 6.5 cm.

In this example, the film formation was performed without turning on the electric heater 103. Into the conduit 101, there was introduced a gas produced by flowing hydrogen gas at a flow rate of 30 sccm into diethyl zinc $(C_2H_5)_2Zn$] contained in a stainless steel cylinder maintained at 5° C. in a thermostatic oven under bubbling condition, which was successively supplied through the conduit 104 into the film forming space of the film forming chamber 109". A gas generated by flowing hydrogen gas at a flow rate of 40 sccm into diethyl selenium {$(C_2H_5)_2Se$} in a stainless-steel cylinder maintained at 5° C. in a thermostatic oven under bubbling condition (not shown in the figure) was introduced through the feed pipe 102 into the activating space. Following the same manner, Ar gas was also introduced in the activating space.

The application of microwave energy into the activating space 105 was carried out by modulating the output power of the microwave power source at two stages of 250 W and 600 W, at 25 cycles/min. At that time, the end of the plasma region formed in the film forming space of the film forming chamber 109" was modulated through the plasma detectors 111-1 and 111-3, to thereby interchangeably repeat the etching mode and the deposition mode to realize the pattern shown in FIG. 6. Particularly, regarding the plasma region formed in the film forming space of the film forming chamber 109", the end of the plasma region was to reach the surface of the substrate 108 at a 500 W output power of the microwave power source, while the plasma region was to end at a position of about 2 cm apart from the substrate 108 at a 200 W output power of the microwave power source, by measuring the emission light of 486 nm from hydrogen radicals. In the two cases, the electron temperature of the plasma was measured by the Langumuir probe 112. The temperature was 5.5 eV in the former case, and it was 1.5 eV in the latter case. The film formation was continued for 2 hours.

On the glass place was formed a polycrystalline ZnSe deposited film. Of the deposited film, the film thickness, the size of crystal grain and the Hall mobility were observed. The film thickness was observed in the same manner as in the foregoing Experiment A-1. As a result, it was 1.1 μm. The size of crystal grain in the film was observed in the same manner as in the foregoing Experiment A-1. As a result, it was 6000 Angstroms. The Hall mobility was observed according to the Van Der Pauw method. As a result, the mobility was found to be 70–90 cm$^2$/v.sec almost all over the whole film, indicating that the film is a polycrystalline film of extreme homogeneity.

EXAMPLE 3

Film formation was performed under the film forming conditions shown in Table 7, using the apparatus shown in FIG. 1.

In this example, instead of modulating the output power of the microwave power source so as to change the concentration of the active species on the substrate, the concentration thereof was made to change by moving back and forth the substrate to change the relative relationship in position between the substrate and the plasma region, to thereby form a polycrystalline silicon deposited film.

As the substrate 108, there was used a No. 7059 glass plate of 50 mm (width) × 50 mm (length) × 1 mm (thickness) in size, manufactured by Corning Glass Works.

The substrate 108 was fixed on the substrate holder 107 movable back and forth through the supporting rod 118 from the outside of the vacuum system. As the raw material gas (A) 116, SiF$_4$ gas was used. The SiF$_4$ gas after heated to 1100° C. by the electric heater 103, was introduced at a flow rate of 100 sccm into the feed pipe 101 maintained at this temperature, and the gas was supplied through the conduit 104 into the film forming space of the film forming chamber 109". As the material gas (B) 115, H$_2$ gas and Ar gas were used. The two gases were introduced through the feed pipe 102 into the activating space 105 at respective flow rates of 200 sccm and 70 sccm. The application of microwave energy into the activating space 105 was carried out by fixing the output power of the microwave power source at 300 W. The distance between the opening of the conduit 104 and the substrate was set at 6.5 cm at the most apart position, and 4.5 cm at the most closest position. By observing the emission light of 486 nm from hydrogen radicals through the plasma detector 111-1, the expansion of the plasma region was measured. Consequently, it was found that the plasma region expanded from the opening of the conduit 104 to a position of 4.5 cm apart therefrom. Therefore, the substrate was contacted with the plasma region when the substrate was made close to the plasma region; the substrate was positioned 2 cm apart from the plasma region, when it was taken apart from the plasma region.

Upon depositing the polycrystalline silicon film, the substrate was made to move back and forth by 2 cm, as described above, at 40 cycles/min, so that the etching mode and the deposition mode were interchangeably repeated. The electron temperature of the plasma was measured by the Langumuir probe 112. The temperature was 4.0 eV. The film formation continued for 2 hours.

In the manner described above, a polycrystalline polysilicon deposited film was formed on the glass plate. Of the deposited film obtained, the film thickness, the size of crystal grain and the hall mobility were observed. The film thickness was observed in the same manner as in the foregoing Experiment A-1. As a result, it was 1.2 μm. The size of crystal grain was observed in the same manner as in the foregoing Experiment A-1. As a result, it was 4000 Angstroms. The Hall mobility was observed according to the Van Der Pauw method. As a result, the mobility was found to be 100–120 cm$^2$/v.sec, almost all over the film, indicating that the film is a polycrystalline film of extreme homogeneity.

EXAMPLE 4

In this example, selective deposition of a polysilicon film was performed according to the method of the present invention.

FIG. 7 shows the process chart therefor.

Figure 7A:
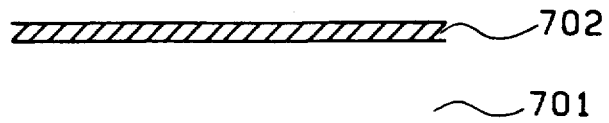
FIGS. 7(A) to 7(D) are schematic explanatory views of the process for forming a polycrystalline deposited film in Example 4 of the present invention.

Using a No. 7059 glass plate manufactured by Corning Glass Works, as the substrate 701, a $SiN_x$ film 702 was deposited on the substrate with a thickness of 2000 Angstroms by the plasma CVD method {FIG. 7(a)}. The deposition conditions were as follows; substrate temperature: 350° C., reaction pressure: 0.2 Torr, RF power: 5 W, raw material gas: $SiH_4$ gas=100 sccm, $NH_3$ gas=200 sccm.

Figure 7B:
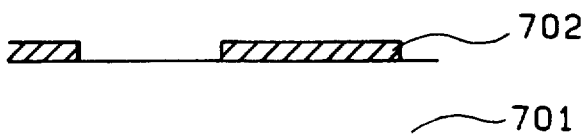

By using a conventional photolithography technique, a resist was subjected to patterning, and the $SiN_x$ film was partially removed by a reactive ion etching process, to form a stripped pattern of a 200 μm width at each 200 μm interval {FIG. 7(b)}. Herein, the surface comprising the $SiN_x$ film 702 was a nucleus-forming face, while the surface of the glass substrate 701 was non-nucleus-forming face.

Figure 7C:
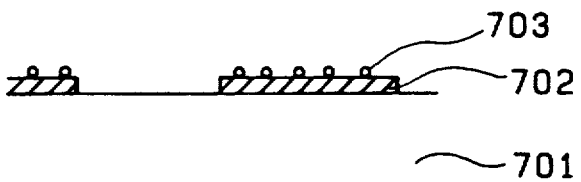

On the substrate thus processed silicon nucleus 703 was selectively generated on the $SiN_x$ film 702, according to the CVD method employing plasma {FIG. 7(c)}.

The CVD method employed was the same as in Example 1 {FIG. 7(c)}.

The forming parameters were as follows:

| | |
|---|---|
| $SiF_4$ | 100 sccm |
| $H_2$ | 200 sccm |
| Ar | 70 sccm |
| Substrate temperature | 350° C. |
| Reaction pressure | 0.05 Torr |
| Microwave output power (2.45 GHz) modulated interchangeably at 200 and 600 W | |
| Output modulation | 20 cycles/min |

When the output power of the microwave power source was 600 W, the end of the plasma region was to reach the substrate surface; while with the power being 200 W, the end of the plasma region was to retreat at a position about 2 cm apart from the substrate.

Figure 7D:

After 2-hour deposition in such manner, a polycrystalline polysilicon film 704 grew only on the $SiN_x$ film, and its thickness was about 1 μm {FIG. 7(d)}. The deposited film 704 grown in stripes was subjected to observation by X ray diffraction. Only an intense peak with a crystalline angle 2θ=47.3° was observed, indicating that a face (220) was preferentially growing. Furthermore, the grain size was found to be about 5000 Angstroms through observation by a transmission-type electron microscope.

EXAMPLE 5

In this example, selective deposition of a polycrystalline ZnSe film was performed according to the method of the present invention.

FIG. 8 shows the process chart therefor.

A No. 7059 glass plate manufactured by Corning Glass Works was used as the substrate 801. A $SiN_x$ film 802 was deposited on the substrate with a thickness of 2000 Angstroms by the plasma CVD method {FIG. 8(a)}. The depositing conditions were as follows; substrate temperature 350° C. reaction pressure: 0.2 Torr, RF power: 5 W, raw material gas: $SiH_4$ gas=100 sccm. $NH_3$ gas=200 sccm.

By using the photolithography technique, a resist 803 was used to form a stripped pattern of a 200 μm width at each 200 μm interval. Then, Zn ion 804 was driven, over the pattern by the resist, at $2 \times 10^{15}$ {FIG. 8(b)}.

After scaling off the resist, there was formed a $SiN_x$ film 805 where Zn ion was driven into the exposed portion {FIG. 8(a)}.

On the substrate thus processed, selective deposition of a polycrystalline ZnSe film was carried out according to the same method as in Example 2.

The forming parameters were as follows;

| | |
|---|---|
| DEZn (carrier $H_2$) | 5° C. |
| $1 \times 10^{-5}$ mol/min | 30 sccm |
| DESe (carrier $H_2$) | 5° C. |
| $1 \times 10^{-5}$ mol/min | 40 sccm |
| Ar | 30 sccm |
| Substrate temperature | 250° C. |
| Reaction pressure | 0.05 Torr |
| Microwave output power (2.45 GHz) modulated interchangeably at 250 and 700 W | |
| Output modulation | 20 cycles/min |

When the output power of the microwave power source was 700 W, the end of the plasma region reached the substrate surface; while with the power being 250 W, the end of the plasma region retreated at a position about 2 cm apart from the substrate. By such manner, a nucleus 806 of ZnSe polycrystalline was generated only in the Zn-ion driving region 805 on the substrate {FIG. 8(d)}.

After 2-hour deposition in such manner, a ZnSe polycrystalline film 807 grew only on the Zn-ion driving region 805 {FIG. 8(e)}, and its film thickness was about 1.2 μm. The ZnSe polycrystalline film grown in the stripe-like state was subjected to observation by X ray diffraction, indicating that a face (111) was preferentially growing. Furthermore, the grain size was found to be about 7000 Angstroms through observation by a transmission-type electron microscope.

TABLE 1

| | |
|---|---|
| film-forming raw material gas and its flow rate $SiF_4$ gas | 100 sccm |
| activation temperature of $SiF_4$ gas | 1100° C. |
| plasma-forming raw material gas and its flow rate | |
| $H_2$ gas | 200 sccm |
| Ar gas | 70 sccm |
| microwave power coupled into the activating chamber 309' (2.45 GHZ) | 300 W |
| substrate temperature | 350° C. |
| inner pressure of the film forming chamber 309" upon film formation | 0.05 Torr |
| film formation period | 1 hour |

TABLE 2

| | |
|---|---|
| film-forming raw material gas and its flow rate $SiF_4$ gas | 100 sccm |
| activation temperature of $SiF_4$ gas | 1100° C. |
| plasma-forming raw material gas and its flow rate | |
| $H_2$ gas | 100 sccm |
| Ar gas | 50 sccm |
| microwave power coupled into the activating chamber 309' (2.45 GHz) | see Table 3 |
| substrate temperature | 350° C. |
| inner pressure of the film forming chamber 309" upon film formation | 0.02 Torr |
| film formation period | 1 hour |

TABLE 3

| Sample No. | microwave power (W) | distance a (cm) | distance b (cm) | electron temperature in plasma (eV) | crystallinity | drift mobility (cm$^2$/V$_s$) | film thickness (Å) | uniformity |
|---|---|---|---|---|---|---|---|---|
| 301 | 200 | 8 | 6 | 2.5 | absent | — | 8000 | ◯ |
| 302 | 200 | 6 | 4 | 2.5 | absent | — | 8200 | ◯ |
| 303 | 200 | 4 | 2 | 2.5 | absent | — | 8000 | ◯ |
| 304 | 200 | 2 | 0 | 2.5 | present | 30 | 6500 | x |
| 305 | 300 | 10 | 6 | 4.1 | absent | — | 8000 | ◯ |
| 306 | 300 | 8 | 4 | 4.1 | present | 30 | 8500 | ◯ |
| 307 | 300 | 6 | 2 | 4.1 | present | 90 | 7200 | x |
| 308 | 300 | 4 | 0 | 4.1 | present | 60 | 6000 | x |
| 309 | 400 | 10 | 4 | 5.2 | present | 100 | 8000 | ◯ |
| 310 | 400 | 8 | 2 | 5.2 | present | 60 | 7000 | x |
| 311 | 400 | 6 | 0 | 5.2 | present | 10 | 5000 | x |
| 312 | 400 | 4 | −2 | 5.2 | present | — | 3000 | x |
| 313 | 500 | 10 | 2 | 6.3 | absent | — | 2000 | — |
| 314 | 500 | 8 | 0 | 6.3 | — | — | — | — |
| 315 | 500 | 6 | −2 | 6.3 | — | — | — | — |
| 316 | 500 | 4 | −4 | 6.3 | — | — | — | — |

TABLE 4

| Sample No. | flow rate of Cl$_2$/H$_2$ gas (sccm) (500 ppm) | microwave power (W) | distance a (cm) | distance b (cm) | electron temperature in plasma (eV) | crystallinity | drift mobility (cm$^2$/V$_s$) | film thickness (Å) | uniformity |
|---|---|---|---|---|---|---|---|---|---|
| 401 | 10 | 200 | 4 | 2 | 2.5 | present | 8 | 7500 | ◯ |
| 402 | 10 | 300 | 10 | 6 | 4.1 | present | 10 | 7200 | x |
| 403 | 10 | 400 | 10 | 4 | 5.2 | present | 70 | 7500 | ◯ |
| 404 | 30 | 200 | 4 | 2 | 2.5 | present | 5 | 7300 | ◯ |
| 405 | 30 | 300 | 10 | 6 | 4.1 | present | 8 | 7000 | x |
| 406 | 30 | 400 | 10 | 4 | 5.2 | present | 40 | 7200 | ◯ |

TABLE 5

| | |
|---|---|
| film-forming raw material gas and its flow rate SiF$_4$ gas | 100 sccm |
| activation temperature of SiF$_4$ gas | 1100° C. |
| plasma-forming raw material gas and its flow rate | |
| H$_2$ gas | 200 sccm |
| Ar gas | 70 sccm |
| microwave power coupled into the activating chamber 109' (2.45 GHz) | modulated from 200 W to 500 W |
| modulation cycle of microwave power | 25 cycles/min. |
| substrate temperature | 350° C. |
| inner pressure of the film forming chamber 109" upon film formation | 0.05 Torr |
| film formation period | 2 hours |

TABLE 6

| | |
|---|---|
| first film-forming raw material gas and its flow rate | |
| (C$_2$H$_5$)$_2$Zn gas | 1 × 10$^{-5}$ mol/min |
| H$_2$ gas (carrier gas) | 30 sccm |
| second film-forming raw material gas and its flow rate | |
| (C$_2$H$_5$)$_2$Se gas | 2 × 10$^{-5}$ mol/min |
| H$_2$ gas (carrier gas) | 40 sccm |
| plasma-forming raw material gas and its flow rate | |
| H$_2$ gas (serving also as a carrier gas for Se) Ar gas | 30 sccm |
| microwave power coupled into the activating chamber 109' (2.45 GHz) | modulated from 250 W to 600 W |
| modulation cycle of microwave power | 20 cycles/min. |
| substrate temperature | 250° C. |
| inner pressure of the film forming chamber 109" upon film formation | 0.1 Torr |
| film formation period | 2 hours |

TABLE 7

| | |
|---|---|
| film-forming raw material gas and its flow rate SiF$_4$ gas | 100 sccm |
| activation temperature of SiF$_4$ gas | 1100° C. |
| plasma-forming raw material gas and its flow rate | |
| H$_2$ gas | 200 sccm |
| Ar gas | 70 sccm |
| microwave power coupled into the | 300 W |

TABLE 7-continued

| | |
|---|---|
| activating chamber 109' (2.45 GHz) | |
| forward and backward moved distance of the substrate | 2 cm |
| forward and backward moved cycle of the substrate | 40 cycles/min. |
| substrate temperature | 350° C. |
| inner pressure of the film forming chamber 109" upon film formation | 0.05 Torr |
| film formation period | 2 hours |

I claim:

1. A method for forming a polycrystalline film, comprising the steps of:

(i) contacting hydrogen gas with an activating energy in a space different from a film forming space of a film forming chamber in which a substrate for film formation is arranged to excite the hydrogen gas into an active species (H), (ii) introducing said active species (H) into the film forming chamber while simultaneously introducing a film forming raw material gas into the film forming chamber, independently from the active species (H), (iii) mixing and contacting the active species (H) with the film forming raw material gas to produce a plasma region in the film forming space maintained at a predetermined pressure, and (iv) periodically changing the distribution of the concentration of the active species (H) near the substrate maintained at a predetermined temperature.

2. The method according to claim 1, wherein the expansion of the plasma region formed in the film forming space is periodically increased and decreased by periodic modulation of the output power of the activating energy from a power source to periodically expose the substrate intermittently to the plasma region.

3. The method according to claim 2, wherein the activating energy is microwave energy.

4. The method according to claim 1, wherein an inert gas is contacted with the activating energy together with the hydrogen gas to excite them in order to generate the active species (H).

5. The method according to claim 1, wherein the substrate is maintained at a temperature in the range from 50° C. to 600° C.

6. The method according to claim 1, wherein the pressure in the film forming space is maintained in the range from $1 \times 10^{-3}$ to 1 Torr.

7. The method according to claim 1, wherein the film forming raw material gas is excited with an activating energy to generate a precursor and the precursor is introduced into the film forming space.

8. The method according to claim 1, wherein the film forming process comprising periodically changing the distribution of the concentration of the active species (H) is carried out while moving the substrate back and forth.

* * * * *

UNITED STATES PATENT AND TRADEMARK OFFICE
CERTIFICATE OF CORRECTION

PATENT NO.   : 5,151,296
DATED        : September 29, 1992
INVENTOR(S)  : HIROYUKI TOKUNAGA It is certified that error appears in the above-identified patent and that said Letters Patent is hereby corrected as shown below:

COLUMN 1

Line 48, "worth" should read --worthy--.

COLUMN 5

Line 48, "is" should read --are--.

COLUMN 7

Line 54, "An" should read --A--.

COLUMN 8

Line 11, "ings." should read --ing.--.

COLUMN 9

Line 49, "situte" should read --situate--.

COLUMN 11

Line 18, "chamber 309," should read --chamber 309",--.
Line 52, "is" should read --said figure is--;
         and "are" should read --is--.
Line 53, "are" should read --is--.
Line 61, "chamber 309"" should read --chamber 309'--.

COLUMN 12

Line 3, "chamber 309"" should read --chamber 309'--.

UNITED STATES PATENT AND TRADEMARK OFFICE
CERTIFICATE OF CORRECTION

PATENT NO. : 5,151,296

DATED : September 29, 1992

INVENTOR(S) : HIROYUKI TOKUNAGA

It is certified that error appears in the above-identified patent and that said Letters Patent is hereby corrected as shown below:

COLUMN 13

Lines 44-46, set as subhead.

COLUMN 15

Line 58, "a" should be deleted.

COLUMN 16

Line 42, "example" should read --examples--.
Line 47, "$SiH_3C_1$," should read --$SiH_3Cl$,--; and "$SiHl_3$" should read --$SiHI_3$--.

COLUMN 17

Line 3, "example" should read --examples--.
Line 7, "example" should read --examples--.
Line 13, "example" should read --examples--.
Line 17, "example" should read --examples--.

COLUMN 18

Line 47, "silm" should read --film--.

COLUMN 19

Line 66, "Langumuir" should read --Langmuir--.

UNITED STATES PATENT AND TRADEMARK OFFICE
CERTIFICATE OF CORRECTION

PATENT NO. : 5,151,296
DATED : September 29, 1992
INVENTOR(S) : HIROYUKI TOKUNAGA It is certified that error appears in the above-identified patent and that said Letters Patent is hereby corrected as shown below:

COLUMN 20

Line 55, "Langumuir" should read --Langmuir--.

COLUMN 21

Line 51, "Langumuir" should read --Langmuir--.

COLUMN 22

Line 52, "Langumuir" should read --Langmuir--.
Col. 11, line 52, after "where" insert --the coefficients of--

Signed and Sealed this

Sixteenth Day of November, 1993

Attest:

BRUCE LEHMAN

Attesting Officer

Commissioner of Patents and Trademarks